(12) United States Patent
Koide

(10) Patent No.: US 6,951,393 B2
(45) Date of Patent: Oct. 4, 2005

(54) PROJECTION TYPE IMAGE DISPLAY APPARATUS AND IMAGE DISPLAY SYSTEM

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 10/614,205

(22) Filed: Jul. 8, 2003

(65) Prior Publication Data

US 2004/0021833 A1 Feb. 5, 2004

(30) Foreign Application Priority Data

| Jul. 31, 2002 | (JP) | 2002-224018 |
| Jul. 31, 2002 | (JP) | 2002-224209 |
| Jul. 31, 2002 | (JP) | 2002-224233 |

(51) Int. Cl.[7] .................................. G03B 21/14
(52) U.S. Cl. .................. 353/31; 353/122; 345/45; 345/76
(58) Field of Search ............... 353/31, 33, 34, 353/37, 122; 348/800, 801; 345/36, 44, 45, 76

(56) References Cited

U.S. PATENT DOCUMENTS

| 6,259,423 B1 | 7/2001 | Tokito et al. ............... 345/76 |
| 6,741,228 B1 * | 5/2004 | Yokoyama et al. ........... 345/76 |
| 6,805,448 B2 * | 10/2004 | Yokoyama et al. ........... 353/85 |
| 2004/0008326 A1 * | 1/2004 | Koide .......................... 353/99 |
| 2004/0021831 A1 * | 2/2004 | Koide .......................... 353/31 |

FOREIGN PATENT DOCUMENTS

| JP | 11-67448 | 3/1999 |
| JP | 2000-66301 | 3/2000 |
| JP | 2000-277266 | 10/2000 |

* cited by examiner

Primary Examiner—William C. Dowling
(74) Attorney, Agent, or Firm—Fitzpatrick, Cella, Harper & Scinto

(57) ABSTRACT

A projection type image display apparatus includes a projection optical system the projects light emitted from an organic EL element onto a target object. The projection optical system has a characteristic non-telecentric toward the EL element with principal rays which pass through the median point of the aperture pupil that captures light diffusively emitted from the EL element converging when seen from the EL element at a pixel position where the object height on the EL element from the optical axis of the projection optical system reaches a maximum.

24 Claims, 20 Drawing Sheets

FIG.12 (A)    FIG.12 (B)
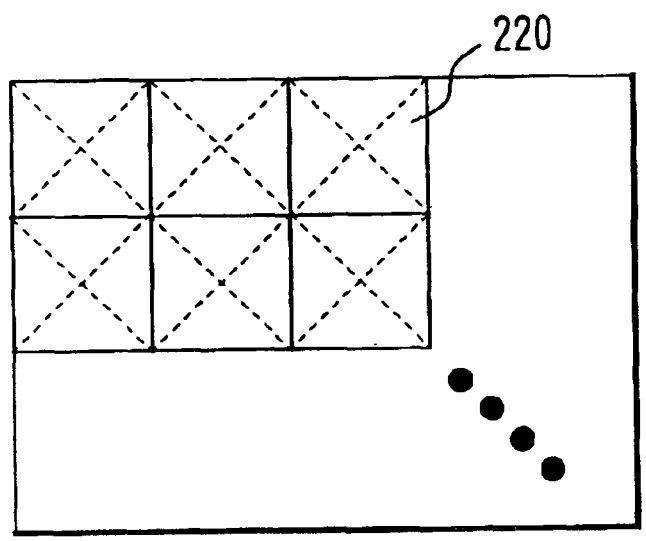
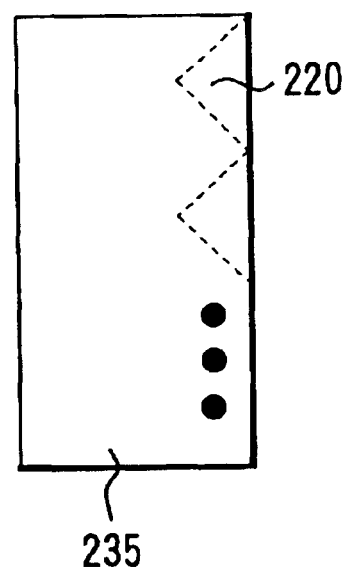
FIG.12 (C)
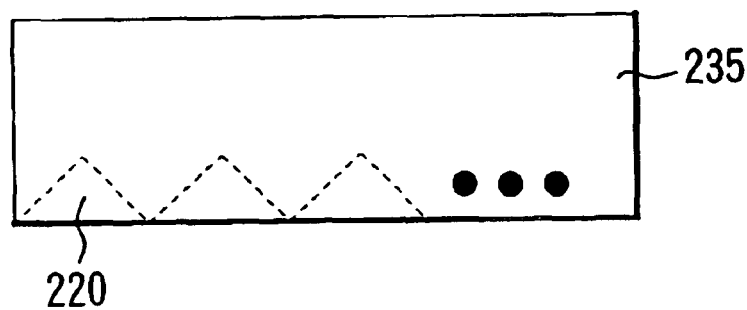

PROJECTION TYPE IMAGE DISPLAY APPARATUS AND IMAGE DISPLAY SYSTEM

BACKGROUND OF THE INVENTION

1. Field of the Invention

The present invention relates to a projection type image display apparatus EL element such as a projector, etc.

2. Description of Related Art

A conventional projection type display normally uses a liquid crystal panel or micromirror device as a light modulation device for switching, projects a light pattern selected by controlling transmission, shielding or deflection of light onto a screen, and thereby displays the image on the screen.

When a liquid crystal panel or micromirror device is used as a light modulation device on the above-described display, it is assumed that shielded light is regarded as unnecessary energy and absorbed by a polarization element or light absorption medium and eliminated. Therefore, to brighten a displayed image, a metal halide or high-pressure mercury lamp is used as a light source, but there are additional problems that a high voltage needs to be used as a light source voltage and the light source produces high heat.

As a method for fundamentally solving such low efficiency of energy usage, there are proposals disclosed in Japanese Patent Application Laid-Open No. H11(1999)-67448(corresponding to U.S. Pat. No. 6,259,423) and Japanese Patent Application Laid-Open No. 2000-66301. In the above-described two proposals, an electroluminescence (EL) panel (hereinafter referred to as "organic EL panel") on which organic electroluminescence elements (hereinafter referred to as "organic EL elements") are arranged in matrix form is used, light emission of each organic EL element of this organic EL panel is driven based on image signals and light from each organic EL element is projected onto a display target object through a projection optical system to display an image.

Since the organic EL element is a self-light-emitting element, there is no need for any separate illumination light source. Furthermore, the organic EL panel can perform light emission based on image information, and therefore there is no need for a transmission type liquid crystal panel, etc. Therefore, it is possible to use the light obtained for displays effectively. The organic EL element can therefore easily display images with lower power without generating unnecessary light energy. Furthermore, since the organic EL panel alone can output images, the apparatus structure is simple and it is easy to reduce the size and weight of the apparatus.

On the other hand, with respect to the characteristic of a projection lens, the above-described Japanese Patent Application Laid-Open No. H11(1999)-67448 and Japanese Patent Application Laid-Open No. 2000-66301 do not disclose any projection lens which is telecentric toward the light source, which captures a light beam in the direction of the normal line of light beams emitted from emission pixels with emission directivity having maximum emission intensity in the direction perpendicular to the emitting surface of the organic EL element at the center of an incident pupil of the projection lens.

In the case of a liquid crystal panel, in order to prevent contrast of image information from reducing, it is necessary to project images using a projection lens which is telecentric toward the liquid crystal light panel. Furthermore, when a micromirror device is used as a light modulation device, the deflection angles of the respective micromirrors are all the same, therefore to capture the light modulated and reflected it is necessary to project images using a projection lens which is telecentric toward the micromirror device. That is, in these cases, projection lenses characterized by being telecentric toward the modulation panel are necessarily used.

Furthermore, as disclosed in the above-described Japanese Patent Application Laid-Open No. H1(1999)-67448, in the case where a light resonance structure made up of a metal electrode in the organic EL element structure and a multilayer dielectric interference reflecting mirror provided outside a transparent electrode facing this metal electrode is used to enhance directivity of the emission characteristic of light, the emission wavelength changes depending on the angle of emission, and therefore it is essential to capture light using a projection lens which is telecentric toward the organic EL element.

Here, when organic EL element having no such light resonance structure is used as an image modulation light-emitting element, a system which captures light using the projection lens which is telecentric toward the organic EL element may be considered as an ideal system for the purpose of capturing a maximum amount of light emitted from the element.

However, when the actual projection system is constructed, the above-described projection lens having a telecentric characteristic has difficulty in keeping the vignetting factor of the pupil at 100% from the standpoint of the design as the object height from the optical axis, that is, the distance of the light-emitting position of the organic EL element from the optical axis increases. For this reason, a design that decreases the vignetting factor as the object height increases is adopted in pursuit of compactness and low cost of lenses.

With regard to a reduction of vignetting factor, that is, increase of vignetting, it is an actual situation that when the field angle of a projection type image display apparatus is as wide as 20 degrees or wider, the vignetting factor due to increase of vignetting becomes 50% or less.

It is not impossible to design a projection lens with a characteristic having vignetting factor of 100% or higher without producing the vignetting. However, this will increase the size of the lens itself and increase manufacturing cost accordingly. Therefore, using a projection lens telecentric toward the organic EL element does not necessarily mean effectively projecting light emitted from the organic EL element and displaying a bright image.

Furthermore, when the organic EL element is caused to emit light continuously at high brightness, the brightness deteriorates notably. There are various causes for this, but one of major causes is that the current supplied to drive the organic EL element produces heat and when this heat is accumulated, the temperature of the element increases, which changes the structure or characteristic of the organic thin film and the luminance efficiency deteriorates gradually.

Thus, the organic EL element is expected to have improved durability through the development of materials at lower cost and improvements in the structure and driving method, etc.

However, when the organic EL element is used as an image modulation light source for the projection type image display apparatus, it is not necessary to widen the angle of visibility to make the organic EL element directly visible from all directions, and not all isotropic light beams emitted from the organic EL element are required, either. Thus, it is necessary to increase the amount of light captured by the projection leans and projected onto a diffusive object such as a screen. It is therefore possible to increase the ratio of light emitted which is captured by the pupil of the projection lens and reduce the ratio of unnecessary emitted light.

Thus, adopting a structure that consequently requires only a small amount of light emitted from the organic EL element can reduce the amount of charge carriers injected into the organic EL element, reduce the amount of heating of the element, suppress variations in the structure or characteristic of the organic thin film and slow down the speed at which the luminance efficiency deteriorates.

On the other hand, as the one capable of improving only directivity of light emitted from the organic EL element, Japanese Patent Application Laid-Open No. 2000-277266 discloses the following proposal. That is, when the organic EL element is used as a flat even illumination light source, the spread of directivity of light emission is suppressed using a prism layer called a "light condensing layer" to improve the directivity of light emission.

However, when the organic EL element is used as an image modulation light emission source, if there is no positional correlation between pixels making up the image and the prism layer, directivities of light emission are not unified into a certain direction. Furthermore, when the luminescent layer is distant from the prism layer, optical crosstalk occurs between pixels, which causes the image to be displayed as multiple images or deteriorates contrast.

Furthermore, when the organic EL element is used as a direct-view type image modulation light emission source, that is, in a system in which light directly enters the eyes from a light source such as a direct-view type display, head up display, head mounted display, etc., a brightness distribution in the light emission direction by a microprism becomes discontinuous, which produces variations in brightness and causes the image to be displayed with glare.

Furthermore, in the actual technological stage, light emission brightness of the organic EL element itself is still insufficient to be used for a display apparatus for enlarged projections when an element with a single-plate two-dimensional structure of three primary colors RGB (red, green, blue) is used. For this reason, it is more realistic to use a method whereby modulations of RGB colors are handled by their respective organic EL elements, three RGB colors are combined to compensate for the amount of light projected. This requires a dichroic wavelength-combining prism having a dichroic waveband separating film (hereinafter referred to as "dichroic film") to combine RGB three primary color beams (color-combination).

Thus, a cross dichroic prism with a crisscross arrangement of dichroic films is most effective and generally used as a dichroic wavelength-combining prism having a projection lens with shorter back focus, which is effective in increasing brightness of the projection lens and widening the angle of projection.

However, since the organic EL element emits light without directivity by recombination of excitons, the emission characteristic of light emitted out of the film structure which forms the organic EL element has a spherical emission characteristic from the emission plane of the element. For this reason, when beams are combined using a cross dichroic prism with conventional dichroic films orthogonally arranged, the deflecting plane of which has a square section, the light emitted from the emission plane of the organic EL element in an oblique direction is partially reflected on neighboring mutually orthogonal planes of incidence of the cross dichroic prism, enters the projection lens and is likely to be displayed outside the image projection region of an object such as a screen as a ghost image.

Examples of remedial actions for this problem include application of black painting or diffusion treatment to the prism surface or coating of an anti-reflection film to areas that cannot be painted or treated. However, when light is reflected on the neighboring mutually orthogonal planes of the prism body, the angle of incidence is shallow with respect to the plane, and therefore reflectance on the interface is high and treatment of the interface cannot achieve significant ghost prevention effects.

On the other hand, as disclosed in the aforementioned Japanese Patent Application Laid-Open No. 1999-67448, even when directivity of a light emission characteristic is enhanced by a light resonance structure made up of a metal electrode in the organic EL element structure and the multilayer dielectric interference reflecting mirror placed outside the transparent electrode facing the metal electrode, it is characterized in that the emission wavelength varies depending on the emission direction and the half-value angle of emission intensity ranges approximately 30° to 40° at a half angle. Thus, even if a F number of the projection lens is set to approximately 1.5, the angle of incidence captured by the projection lens is a little less than 20°, which does not provide directivity enough to avoid reflections on the neighboring mutually orthogonal planes of the prism.

SUMMARY OF THE INVENTION

It is an object of the present invention to provide a projection type image display apparatus capable of effectively capturing light emitted from an organic EL element and brightening an image without increasing the size and cost of a projection optical system.

To attain this object, the projection type image display apparatus of the present invention includes an electroluminescence (EL) element having a plurality of pixels that can be individually modulated and a projection optical system that projects light emitted from the pixels in the EL element onto a projection target object. The EL element comprises two-dimensionally arranged pixels which form excitons by injecting charge carriers into a luminescent layer and generate and emit light by recombination of the excitons.

Then, the projection optical system has a non-telecentric characteristic toward a luminous object with principal rays which pass through the median point of the aperture pupil that captures diffused emission light from the pixels converging, when seen from the EL element at a pixel position at which the object height of the EL element as the luminous object from the optical axis of the projection optical system reaches a maximum.

Furthermore, it is another object of the present invention to provide a projection type image display apparatus capable of improving directivity of light emitted from an organic EL element, displaying a bright image by increasing the ratio of the amount of light captured by the pupil of the projection optical system and suppressing deterioration of luminance efficiency due to variations in the structure or characteristic of the organic thin film of the organic EL element.

To attain this object, the projection type image display apparatus of the present invention includes an electroluminescence (EL) element having a plurality of pixels that can be individually modulated and a projection optical system that projects light emitted from the pixels in the EL element onto an object. The EL element comprises two-dimensionally arranged pixels which form excitons by injecting charge carriers into a luminescent layer and generate and emit light by recombination of the excitons.

Then, the luminescent layer of the EL element has a film structure based on a structure in which the luminescent layer is sandwiched between one or more charge carrier transfer layers for supplying electrons and holes to the luminescent layer.

On the light emission plane in the above-described film structure, a light emission direction control element comprising two-dimensionally arranged microstructures each having a pyramid-shaped pentahedron as a boundary of refractive indices is placed in contact therewith.

Furthermore, it is a further object of the present invention to provide a projection type image display apparatus capable of controlling generation of a ghost image when an organic EL element and cross dichroic wavelength-combining element are used.

To attain this object, the projection type image display apparatus of the present invention includes three electroluminescence (EL) elements each having a plurality of pixels that can be modulated individually and emitting three primary color beams, a cross dichroic wavelength-combining element that combines the beams emitted from the three EL elements using dichroic films in a crossing arrangement and a projection optical system that projects the light combined by the cross dichroic wavelength-combining element onto an object to display an additive color mixture image. Each of the EL elements comprises two-dimensionally arranged modulation pixels which form excitons by injecting charge carriers into a luminescent layer and generate and emit light by recombination of the excitons.

Then, the cross dichroic wavelength-combining element has a prism shape with six or more external surfaces, and an acute angle formed between the dichroic film and the optical axis of the projection optical system is greater than 45°. The cross dichroic wavelength-combining element has four external surfaces perpendicular to three optical axes including the optical axis of the projection optical system subject to deflection by the dichroic film, and the three of the four external surfaces are arranged substantially in parallel to the modulation emission surface of the three EL elements, and the combined light is emitted from the remaining one external surface to the projection optical system.

The features of the projection type image display apparatus of the present invention will become more apparent by reference to the following detailed description of the invention taken in conjunction with the accompanying drawings.

BRIEF DESCRIPTION OF THE DRAWINGS

FIG. 12 illustrates a structure of a light emission direction control element having microprisms;

DETAILED DESCRIPTION OF THE PREFERRED EMBODIMENTS

With reference now to the attached drawings, embodiments of the present invention will be explained below.

(Embodiment 1)

Figure 1:
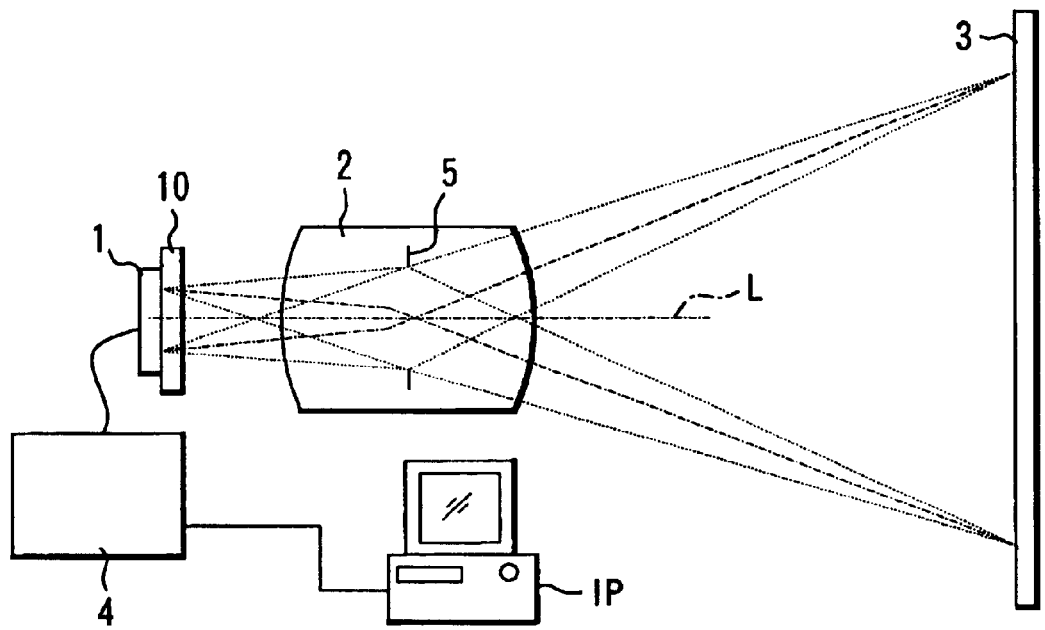
FIG. 1 is a sectional view of a main optical system of a projector which is Embodiment 1 of the present invention.

FIG. 1 is a sectional view of a main optical system of a projector (projection type image display apparatus) which is Embodiment 1 of the present invention.

Reference numeral 1 denotes an electroluminescence (EL) element that emits light including image information and is an organic EL element as will be explained later. This EL element 1 comprises a plurality of pixels that emit light including image information as light pattern information. A detailed structure of this EL element 1 will be explained later.

Reference numeral 10 denotes a glass substrate that holds a film structure of the EL element 1.

Reference numeral 4 denotes a controller made up of a CPU, etc., which electrically controls the EL element 1 according to image signals from an image signal providing apparatus IP such as a personal computer, DVD player, VCR, video camera, TV, and unit of an antenna and tuner that receive image signals. The EL element 1 emits light patterned based on the electrical signals from the controller 4.

The light emitted from the EL element 1 is captured by a projection lens 2 and projected onto a screen 3 which is a projection target object. The surface of the screen 3 has a light diffusion characteristic and the observer can recognize the image by viewing the light diffused and reflected by this screen 3.

The screen 3 may be either of the above-described reflection type or a transmission type. In both cases, using the screen having at least a predetermined diffusion characteristic, the apparatus can function as an image display system which recognizes the image by directly viewing the screen 3.

In the above-described structure, the projection lens 2 is formed by a lens unit which is non-telecentric toward the EL element 1 as a luminous object. The projection lens 2 has a characteristic that principal rays that pass through the median point of an aperture stop 5, that is the median point of the incident side pupil which is the image of the aperture stop 5 when the projection lens 2 is seen from the EL element 1, has an angle (non-parallel to the optical axis L) converging from the position distant from the optical axis L of the projection lens 2 on the image modulation plane of the EL element 1 (especially the pixel position when the object height of the EL element 1 as the luminous object reaches a maximum) toward the projection lens 2.

(Embodiment 2)

Figure 2:
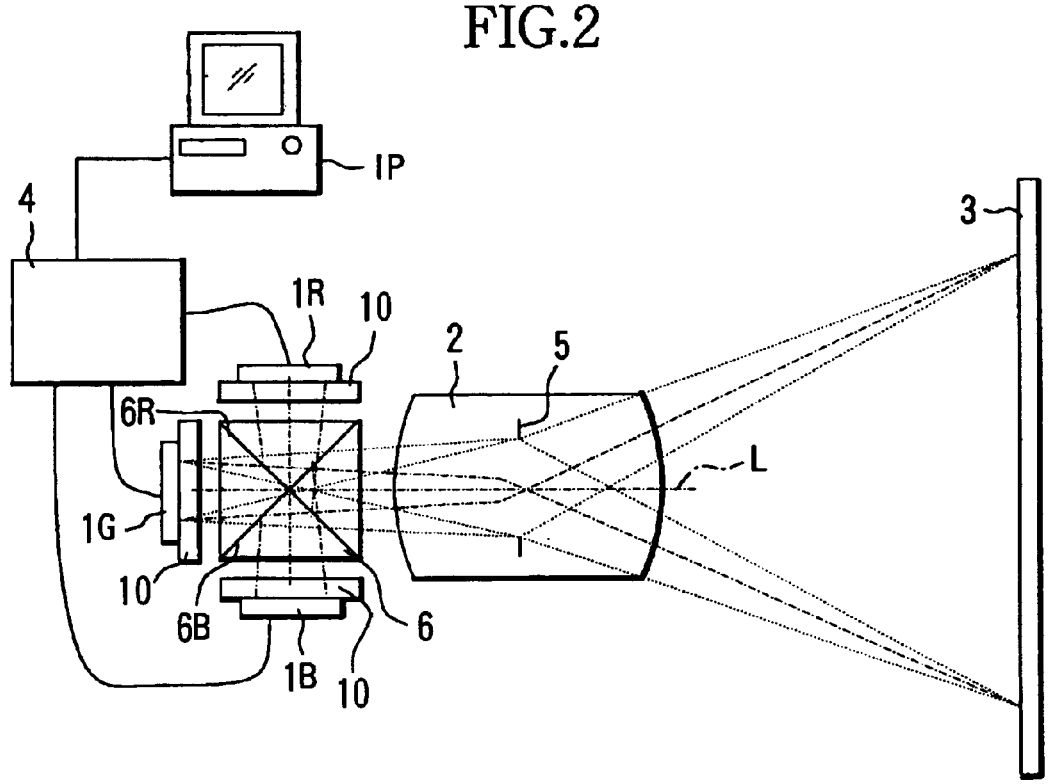
FIG. 2 is a sectional view of a main optical system of a projector which is Embodiment 2 of the present invention.

FIG. 2 is a sectional view of a main optical system of a projector (projection type image display apparatus) which is Embodiment 2 of the present invention.

Reference characters 1R, 1G and 1B denote EL elements that emit color beams of red, green and blue which are three primary colors for an additive color mixture image, and are organic EL elements in this embodiment as will be described later. Each of these EL elements 1R, 1G and 1B comprises a plurality of pixels which emit light including image information as light pattern information. The controller 4 sends electric signals to the EL elements 1R, 1G and 1B according to image signals input from an image signal providing apparatus IP (the same as described in Embodiment 1) and controls these EL elements 1R, 1G and 1B. The EL elements 1R, 1G and 1B emit color light beams that they handle respectively based on the electric signals from the controller 4. Specific structures of the EL elements 1R, 1G and 1B will be described later.

Reference numeral 10 denotes a glass substrate that holds the film structure of each EL element 1R, 1G or 1B.

The light beams emitted from the EL elements 1R, 1G and 1B are combined by a wavelength-combining (color-combining) prism 6. The wavelength-combining prism 6 is generally called a "cross dichroic prism" and comprises a dichroic waveband separating film 6R that reflects the red light and transmits the green light and blue light and a dichroic waveband separating film 6B that reflects the blue light and transmits the green light and red light in a crossing arrangement. Therefore, the green light is transmitted without being affected by the wavelength-combining prism 6.

By using this wavelength-combining prism 6, the light (image information light) emitted from the EL element 1R handling the red color is deflected toward the projection lens 2 by the dichroic waveband separating film 6R and the light (image information light) emitted from the EL element 1B handling the blue color is deflected toward the projection lens 2 by the dichroic waveband separating film 6B. On the other hand, the light (image information light) emitted from the EL element 1G handling the green color advances toward the projection lens 2 without receiving a deflecting effect.

The three EL elements 1R, 1G and 1B are mechanically or electrically adjusted so that the beams from the corresponding pixels overlap with one another on the screen 3 with predetermined accuracy. Furthermore, instead of the wavelength-combining prism 6, a 3-piece prism or 4-piece prism which is often used in a video received light color-separating optical system may be employed as well as the above-described cross dichroic prism in the figure.

The light modulated by the EL elements 1R, 1G and 1B and color-combined by the wavelength-combining prism 6 is projected onto the screen 3 by the projection lens 2.

The surface of the screen 3 has a light diffusion characteristic and the observer can recognize the image by viewing the light diffused and reflected by this screen 3.

The screen 3 may be either of the above-described reflection type or a transmission type. In both cases, using the screen having at least a predetermined diffusion characteristic, the apparatus can function as an image display apparatus which recognizes the image by directly viewing the screen 3.

In the above-described structure, the projection lens 2 is formed by a lens unit which is non-telecentric toward the EL elements 1R, 1G and 1B as luminous objects. The projection lens 2 has a characteristic that principal rays that pass through the median point of an aperture stop 5 has an angle (non-parallel to the optical axis L) converging from the position distant from the optical axis L of the projection lens 2 on the image modulation plane of the EL elements 1R, 1G and 1B toward the projection lens 2.

(EL Element)

Then, the structures of the EL elements used in Embodiment 1 will be explained using FIGS. 3(A) and (B). As shown in FIG. 3(B), the basic structure of the EL element 1 consists of a transparent glass substrate 10 as the base material and luminescent materials 11, 12 and 13 sandwiched between an ITO (indium-tin oxide) transparent thin film electrode 14 and a metal thin film electrode 15. In order to efficiently inject hole carriers into the luminescent materials 11, 12 and 13, a hole transport layer 16 is placed between the ITO transparent thin film electrode 14 and luminescent materials 11, 12 and 13.

When holes are injected from the ITO transparent thin film electrode 14 into the luminescent materials 11, 12 and 13 through the hole transport layer 16 and electrons are injected from the metal thin film electrode 15, the injected holes and electrons are re-combined in the luminescent materials 11, 12 and 13, producing light emission.

This is the basic structure of the EL element 1 and each emission pixel is constructed of the ITO transparent thin film electrode 14 and metal thin film electrode 15 arranged in a wiring matrix form.

The luminescent layer has a derivative for transporting electrons and holes and a fluorescent or phosphorescent material as the luminous body.

The luminescent colors such as red, green and blue are determined by a phosphorescent material which is a luminescent material arranged in the luminescent layer, for example, a hetero-molecular structure of iridium complex and a derivative material for transporting charge carriers.

Figure 3:
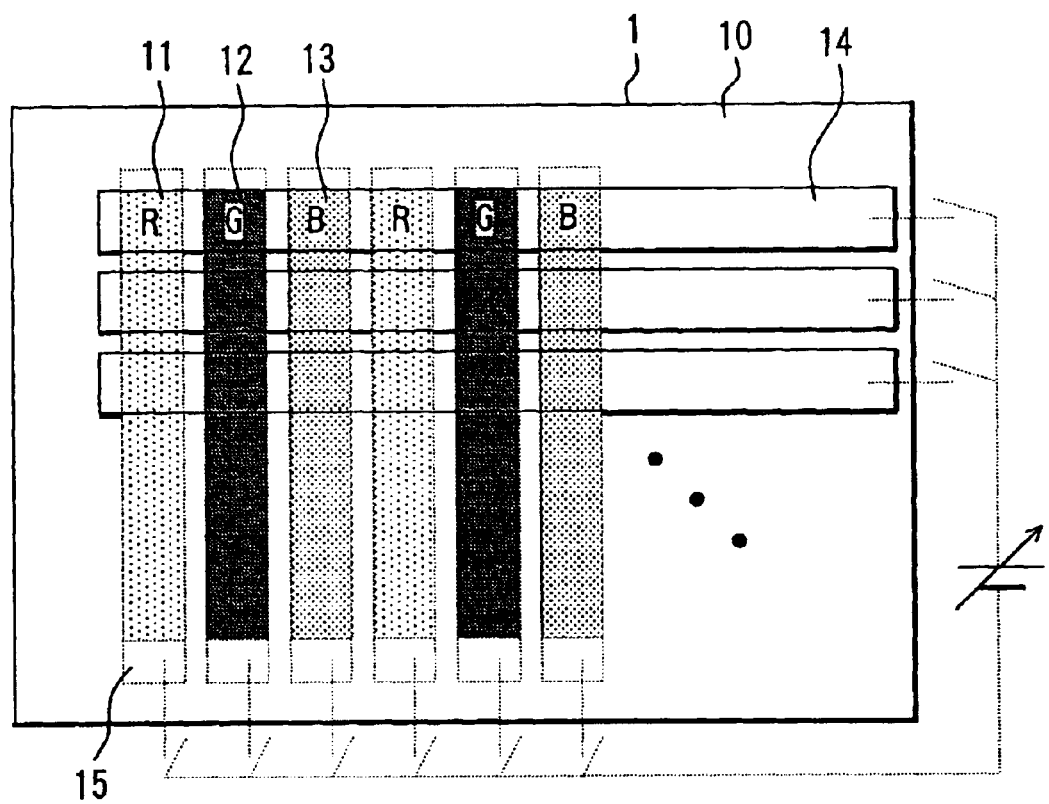
FIGS. 3(A) and 3(B) are schematic views of main parts of an EL element used in Embodiment 1.
Figure 3:
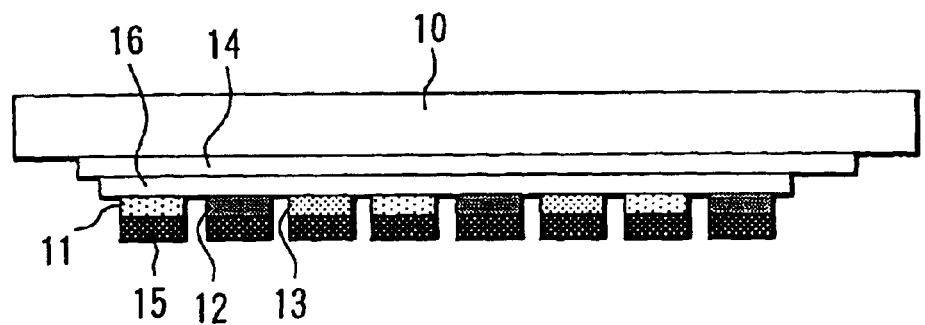

As shown in FIG. 3(A), the EL element 1 that expresses a full color image is realized by placing a luminescent material 11 handling red light, a luminescent material 12 handling green light and a luminescent material 13 handling blue light by turns.

On the other hand, patterning of the luminescent materials 11, 12 and 13 is generally performed using a method of coating an organic luminescent material onto a substrate using a vapor deposition method. That is, to create the EL element 1 with three primary color emission pixels, parts requiring no coating are masked for each color by resist patterning, the luminescent materials of three primary colors (RGB) are coated sequentially by a lift-off method and a pattern can be thereby placed.

Figure 4:
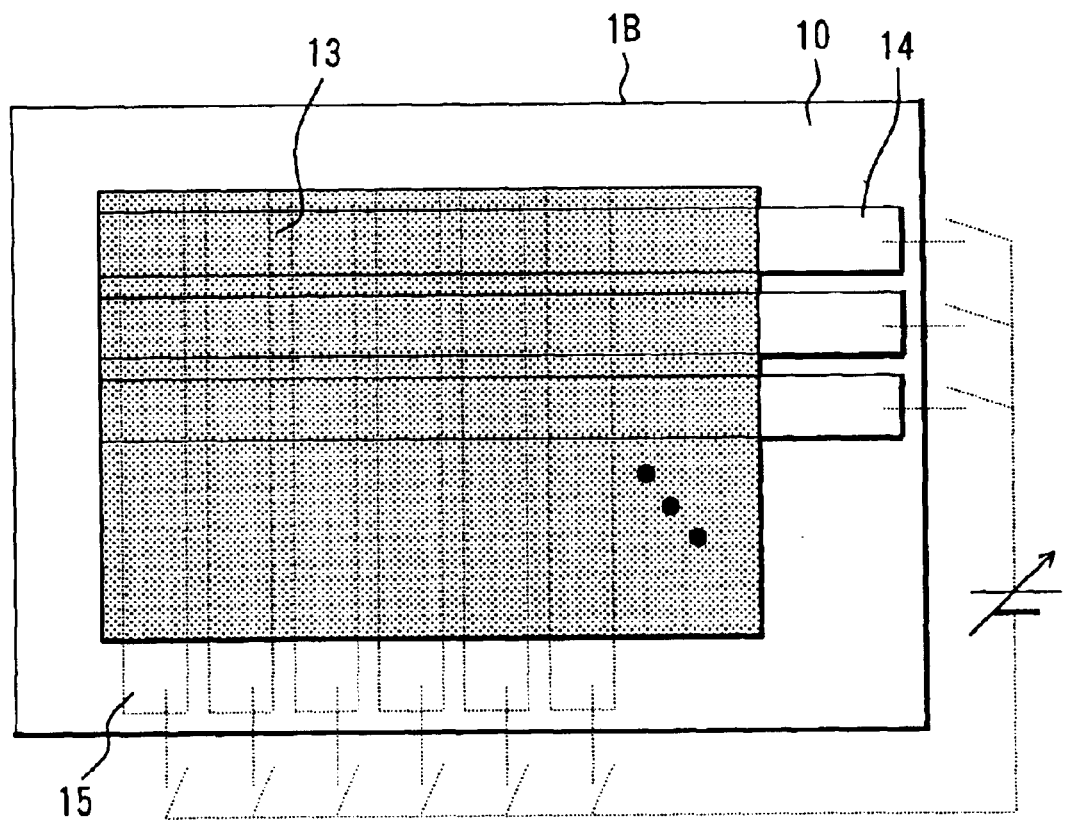
FIGS. 4(A) and 4(B) are schematic views of main parts of an EL element used in Embodiment 2.
Figure 4:
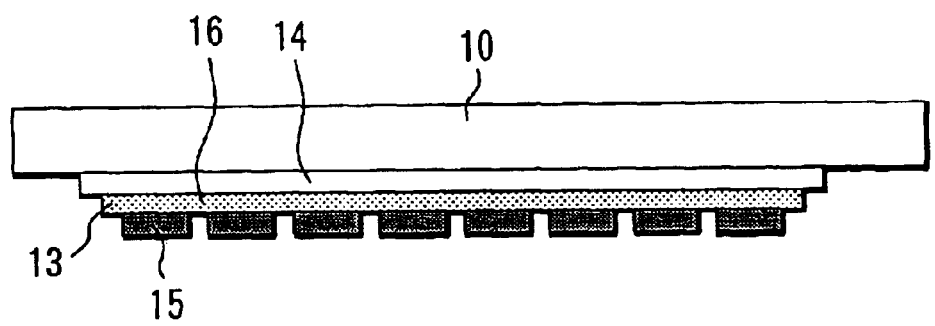

As shown in FIGS. 4(A) and 4(B), the structures of the EL elements 1R, 1G and 1B used in Embodiment 2 consist of those explained in Embodiment 1 without the structure in which the pattern of the luminescent materials of three primary colors is placed. The figures show only the blue EL element 1B, but the other color EL elements are also constructed in the same way.

The EL element 1R that emits red light has the luminescent material 11 that emits red light and the EL element 1G that emits green light has the luminescent material 12 that emits green light. Furthermore, the EL element 1B that emits blue light has the luminescent material 13 that emits blue light.

In this embodiment, an iridium complex is used as a luminous body, and a type of the iridium complex whose potential energy gap has been changed by molecules obtained by substituting a part of a complex base of the complex structure or molecules obtained by substituting terminal atoms for an emission wavelength. Furthermore, it is also possible to adopt a film structure improving the efficiency of generating excitons by forming a double hetero potential structure having an electron transport layer also serving as a hole blocking layer and a hole transport layer also serving as an electron blocking layer.

On the other hand, since the phosphorescent material that emits light from the excited triplet state has quantum conversion efficiency theoretically four times that of fluorescent material that emits light from the excited singlet state, a larger amount of light emission can be converted with respect to the energy of power input, providing high luminance efficiency. Therefore, using the EL element as the modulation light source of the projection type image display apparatus makes it possible to obtain a bright displayed image more easily, which is effective in improving the quality of the projection type image display apparatus.

Next, an effect of using a projection lens having a non-telecentric characteristic toward the EL element 1 (luminous object) will be explained using FIG. 5 and FIG. 6.

Figure 5:
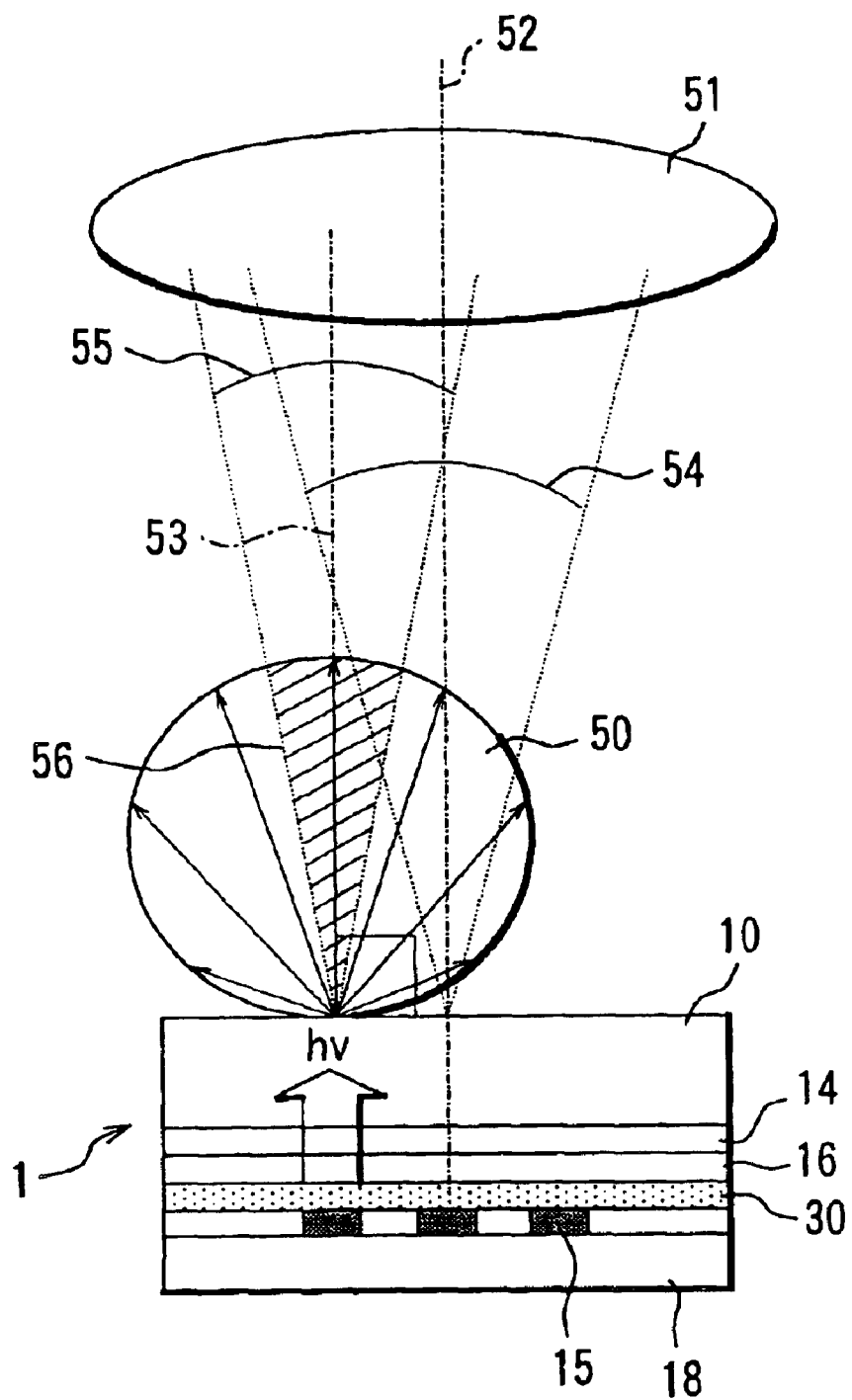
FIG. 5 illustrates an optical action using a projection lens having a telecentric characteristic toward the EL element.

First, FIG. 5 shows a system that projects light emitted from the EL element 1 by a projection lens (hereinafter referred to as "telecentric projection lens") 51 having a telecentric characteristic toward the EL element and the structure from the telecentric projection lens 51 to the screen is omitted.

The EL element 1 is constructed of an electroluminescence film structure formed on the glass substrate 10 and films are formed from top to bottom in the figure in terms of the manufacturing process.

First, an ITO transparent thin film electrode 14 made of ITO and divided for every pixel row of a pattern (not shown) to modulate an image for injecting holes is formed on the glass substrate 10.

Then, a hole transport layer 16 for injecting holes into a luminescent layer 30, the luminescent layer 30 that emits fluorescent or phosphorescent light by re-combining excitons formed of electrons and holes, a metal thin film electrode 15 divided for each pixel column to modulate an image for injecting electrons and a protective layer 18 for protecting the element from gases in the atmosphere are formed in this order.

Light hv which is generated when charge carriers of electrons and holes are injected into the luminescent layer 30 is emitted out of the element due to the influence of a difference in refractive indices between the glass substrate 10 and the atmosphere as a main factor in a spherical light emission distribution 50 embracing the arrows in the figure from the external surface of the glass substrate 10.

To make it easier to understand how the telecentric projection lens 51 captures the emitted light, this figure describes the focus point of the telecentric projection lens 51 focused on the external surface of the glass substrate 10. However, the focus point of the telecentric projection lens 51 which is actually used is focused on the surface of the luminescent layer 30 where the image is subject to modulation and light emission.

Of the light emitted outward with the light emission distribution 50, the light (amount of light) included in a hatching volume region 56 is captured within a range of a solid angle 55 of the maximum object height out of the optical axis with respect to the EL element 1 observed from the pupil (lens pupil) whose median point is the position where a principal ray 53, which is parallel to the optical axis 52 of the telecentric projection lens 51 and perpendicular to the emission plane of the EL element 1, passes.

On the other hand, as stated above, the telecentric projection lens 51 has difficulty in keeping the vignetting factor of the pupil with a high object height at 100% from the standpoint of design and the area of the lens pupil whose mediant point is the position where the principal ray 53 passes is smaller than that of the lens pupil on the optical axis 52. For this reason, the solid angle 55 of the maximum object height out of the optical axis observed with respect to the EL element 1 is smaller than the solid angle 54 observed with respect to the EL element 1 on the optical axis 52 and the telecentric projection lens 51 can capture the light emitted from the EL element 1 only by an amount smaller than that captured on the optical axis 52.

The vignetting factor of the maximum object height of the lens having a characteristic telecentric toward the object having a wide field angle of 20° is generally on the order of 50% and the ratio of reduction in illumination from the maximum illumination at the end of the projected image is approximately 50%.

Figure 6:
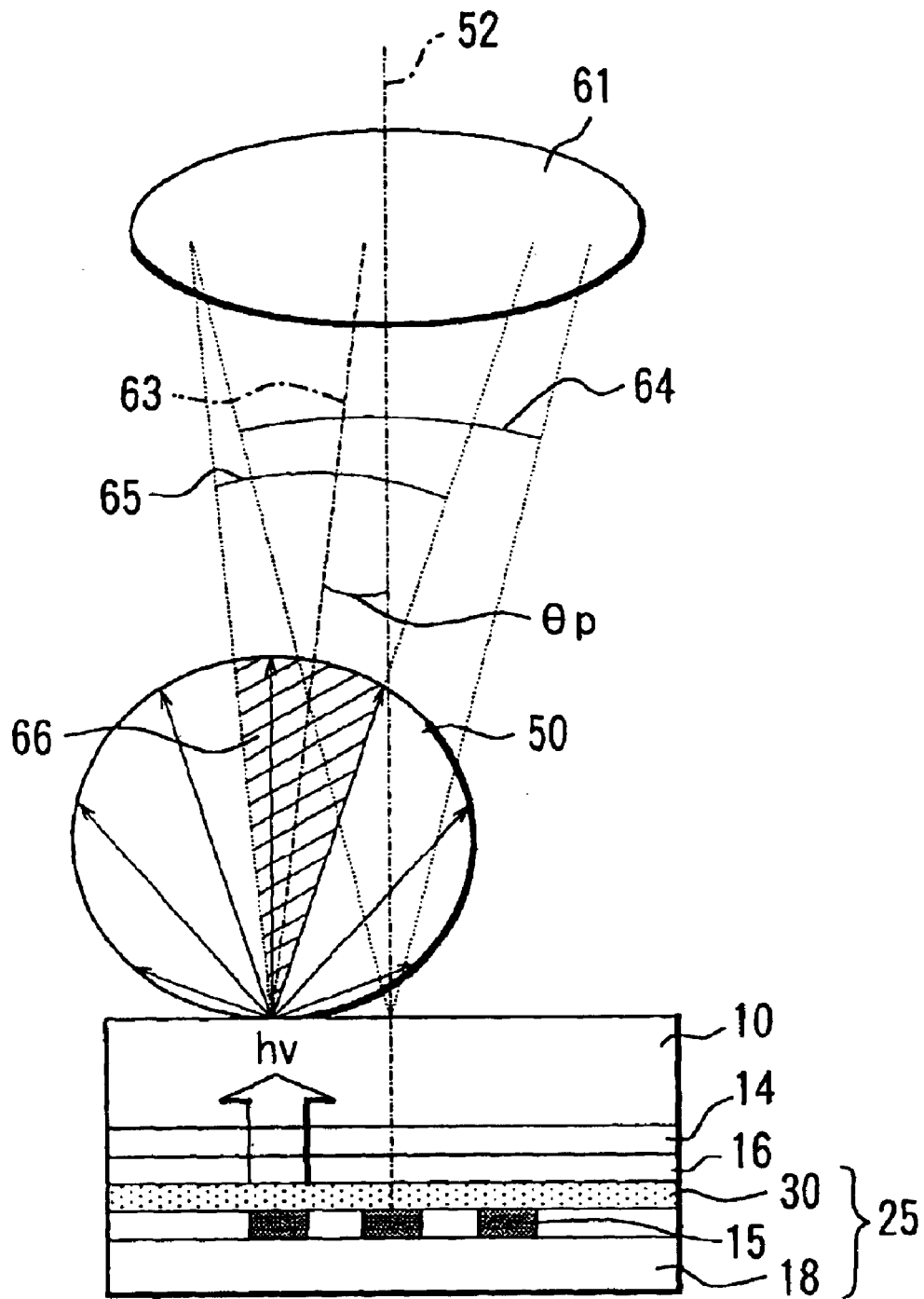
FIG. 6 illustrates an optical action using a projection lens having a non-telecentric characteristic toward the EL element.

In contrast to this configuration, FIG. 6 shows a system in which the light emitted from the EL element 1 is projected by a projection lens (hereinafter referred to as "non-telecentric projection lens") 61 having a characteristic non-telecentric toward the EL element 1. The structure from the non-telecentric projection lens 61 to the screen is omitted.

The EL element 1 is constructed of an electroluminescence film structure formed on the glass substrate 10 as in the case of the EL element shown in FIG. 5 and films are formed from top to bottom in the figure in terms of the manufacturing process. First, an ITO transparent thin film electrode 14 made of ITO and divided for every pixel row of a pattern (not shown) to modulate an image for injecting holes is formed on the glass substrate 10.

Then, a hole transport layer 16 for injecting holes into a luminescent layer 30 is formed, the luminescent layer 30 that emits fluorescent or phosphorescent light by re-combining excitons formed of electrons and holes, a metal thin film electrode 15 divided for each pixel column to modulate an image for injecting electrons and a protective layer 18 for protecting the element from gases in the atmosphere are formed in this order.

Light hv which is generated when charge carriers of electrons and holes are injected into the luminescent layer 30 is emitted out of the element due to the influence of a difference in refractive indices between the glass substrate 10 and the atmosphere as a main factor in a spherical light emission distribution 50 embracing the arrows in the figure from the external surface of the glass substrate 10.

To make it easier to understand how the non-telecentric projection lens 61 captures the emitted light, this figure describes the focus point of the non-telecentric projection lens 61 focused on the external surface of the glass substrate 10. However, the focus point of the non-telecentric projection lens 61 is actually used focused on the surface of the luminescent layer 30 where the image is subject to modulation and light emission.

Of the light emitted outward with the light emission distribution 50, the light (amount of light) included in a hatching volume region 66 is captured within a range of a solid angle 65 of the maximum object height from the optical axis with respect to the EL element 1 observed from the pupil (lens pupil) whose median point is the position where a principal ray 63 of the non-telecentric projection lens 61 passes.

On the other hand, as stated above, it is relatively easy from the standpoint of design for the non-telecentric projection lens 61 to keep the vignetting factor of the pupil with a high object height around 100% and the area of the lens pupil whose median point is the position where the principal ray 63 passes is substantially equivalent to that of the lens pupil on the optical axis 62. For this reason, the solid angle 64 observed with respect to the EL element 1 on the optical axis 62 is substantially equivalent to the solid angle 65 of the maximum object height out of the optical axis observed with respect to the EL element 1.

Thus, the decrease in the amount of light captured at the maximum object height out of the optical axis is merely approximately $\cos \theta p$ compared to the amount of light captured on the optical axis 62, where $\theta p$ is a maximum angle of the principal ray (angle of the EL element at the maximum object height of the principal ray with respect to the normal line of the image modulation plane).

In the case of a lens having a wide field angle of 20° and a characteristic non-telecentric toward the luminous object (EL element), if the maximum principal ray angle $\theta p$ on the luminous object side is 10°, a hatching volume region 66 becomes approximately $\cos \theta p = 98.5\%$ compared to a case where light emitted in the direction perpendicular to the EL element 1 is captured assuming that the solid angle observed with respect to the EL element 1 is equivalent. On the other hand, the vignetting factor at the maximum object height is approximately 80% or more, and therefore the ratio of reduction in illumination from the maximum illumination at the end of the projected image is 78% or more in total.

Therefore, the system using the non-telecentric projection lens 61 shown in FIG. 6 obtains illumination at the end of the projected image over 1.5 times that of the system in which light emitted from the EL element 1 is captured by the telecentric projection lens 51 shown in FIG. 5. This allows image projection with uniform illumination and makes it possible to display a projected image whose end is substantially bright.

Moreover, this allows design of a more compact projection lens with a wider field angle, resulting in the merit that the projection type image display apparatus can be manufactured at lower cost, with an added value.

Here, when using the projection lens 2 having a characteristic non-telecentric toward the EL element that the principal rays converge from the EL element side toward the lens pupil, the light beams emitted from three EL elements 1R, 1G and 1B emitting three primary color beams are combined by the wavelength-combining element such as the dichroic wavelength-combining prism 6 and then the combined light is projected onto an object (screen 3) by the projection lens 2 to display an additive color mixture image, the following problem occurs.

That is, in this case, since the above $\theta p$ value varies depending on the position of the modulated image of the EL element, the cut wavelength band (wavelength band where transmission is replaced by reflection or wavelength band where reflection is replaced by transmission) of the wavelength band where light is reflected on or is transmitted through the dichroic waveband separating films 6R and 6B (hereinafter abbreviated as "red reflecting dichroic film" and "blue reflecting dichroic film") shifts. For this reason, in the case where light emitted from the EL element has a broad wavelength band, the cut wavelength band varies depending on the position of the modulated image of the EL element, producing a problem that color reproducibility changes depending on the position of the projected image.

To avoid this problem, the method of combining three primary colors will be explained using FIG. 7.

Figure 7:
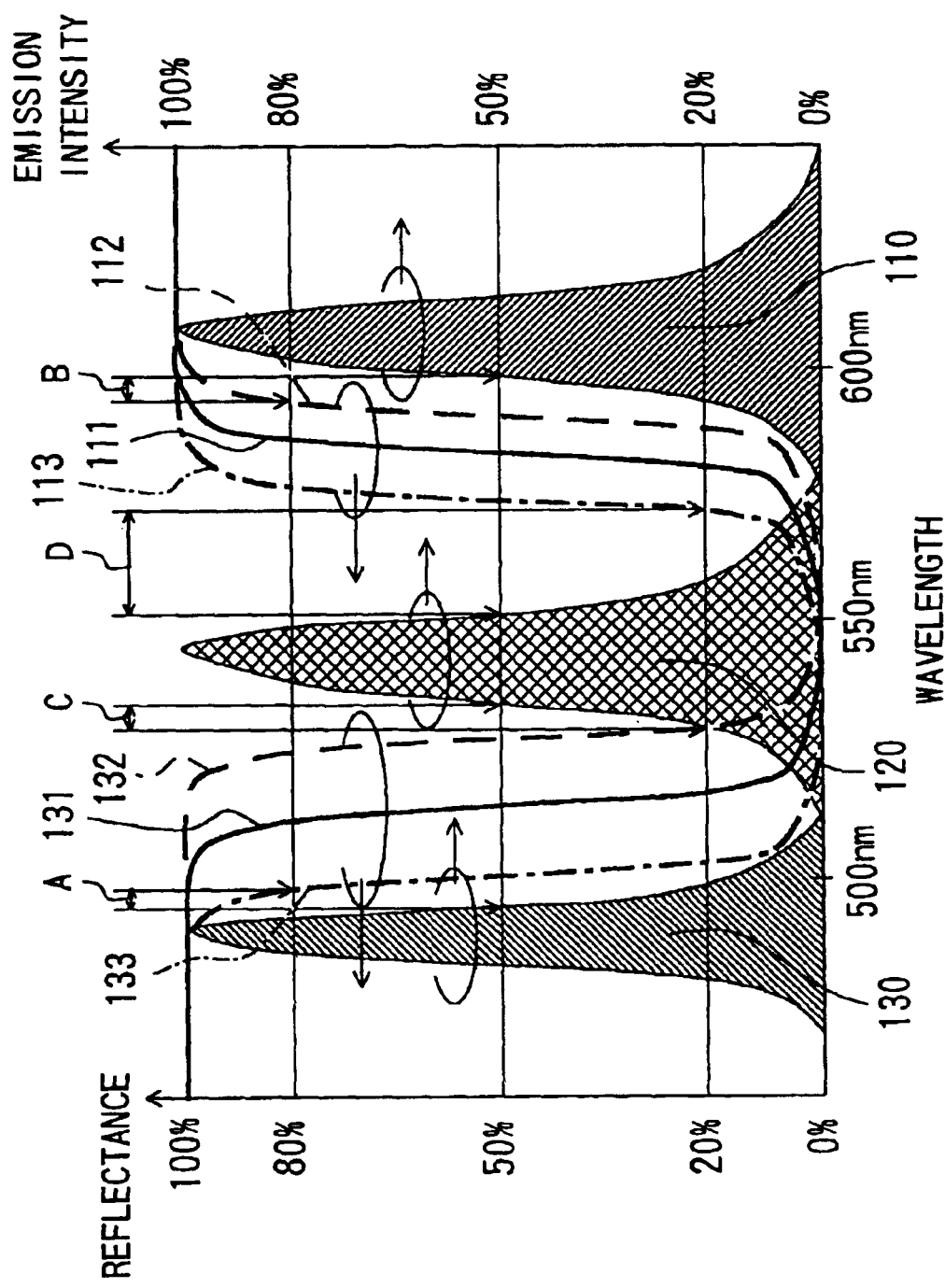
FIG. 7 illustrates a method of combining three primary colors.

In FIG. 7, reference numeral 110 denotes an emission intensity wavelength distribution of the EL element emitting a red color beam (hereinafter referred to as "red EL element") 1R, 120 denotes an emission intensity wavelength distribution of the EL element emitting a green color beam (hereinafter referred to as "green EL element") 1G and 130 denotes an emission intensity wavelength distribution of the EL element emitting a blue color beam (hereinafter referred to as "blue EL element") 1B.

As shown in FIG. 2, the light emitted from the red EL element 1R is led into the projection lens 2 through reflection by the red reflecting dichroic film 6R that reflects the red light and transmits the green light and blue light and transmission through the blue reflecting dichroic film 6B that reflects the blue light and transmits the green light and red light pass.

Furthermore, the light emitted from the blue EL element 1B is led into the projection lens 2 through reflection by the blue reflecting dichroic film 6B that reflects the blue light and transmits the green light and red light and transmission through the red reflecting dichroic film 6R.

Furthermore, the light emitted from the green EL element 1G is led into the projection lens 2 through transmission of the red reflecting dichroic film 6R and the blue reflecting dichroic film 6B.

These combined light beams emitted from the three EL elements 1R, 1G and 1B are projected onto the screen 3 through the projection lens 2 and display an additive color mixture image.

Here, suppose the angle formed by the normal lines of the dichroic films 6R and 6B with respect to the optical axis of the projection lens 2 is $\theta a$, the angle formed by the principal ray with respect to the normal line of the emission plane of the EL element at the position of the maximum object height from the optical axis of the projection lens 2 in the emission region of the EL element within the plane on which the three color beams are combined is $\theta p$ and the half angle at which the pupil (lens pupil) that captures the light emitted from the projection lens 2 observes the position of the maximum object height from the optical axis of the projection lens 2 of the emission region of the EL element is $\theta n$.

In this case, an average reflectance of S-polarized light and P-polarized light at an angle of incidence $\theta a$ of the red reflecting dichroic film 6R shows the distribution denoted by reference numeral 111 and an average reflectance of S-polarized light and P-polarized light at an angle of incidence $\theta a + \theta p + \theta n$ of the red reflecting dichroic film 6R shows the distribution denoted by reference numeral 112.

Furthermore, an average reflectance of S-polarized light and P-polarized light at an angle of incidence $\theta a - \theta p - \theta n$ of the red reflecting dichroic film 6R shows the distribution denoted by reference numeral 113, an average reflectance of S-polarized light and P-polarized light at an angle of incidence $\theta a$ of the blue reflecting dichroic film 6R shows the distribution denoted by reference numeral 131, an average reflectance of S-polarized light and P-polarized light at an angle of incidence θa+θp+θn of the blue reflecting dichroic film 6R shows the distribution denoted by reference numeral 132. Furthermore, an average reflectance of S-polarized light and P-polarized light at an angle of incidence θa−θp−θn of the blue reflecting dichroic film 6R shows the distribution denoted by reference numeral 133.

A half-value intensity wavelength on the short wavelength side of the wavelength spectrum of the light emitted from the red EL element 1R is longer than the 80% reflected wavelength at the average reflection distribution 112 of S-polarized light and P-polarized light that form an angle of incidence of θa+θp+θn with respect to the normal line of the red reflecting dichroic film 6R by the wavelength width denoted by reference character B in the figure.

A half-value intensity wavelength on the long wavelength side of the wavelength spectrum of the light emitted from the blue EL element 1B is shorter than the 80% reflected wavelength at the average reflectance 133 of S-polarized light and P-polarized light that form an angle of incidence of θa−θp−θn of the blue reflecting dichroic film 6B by the wavelength width denoted by reference character A in the figure.

A half-value intensity wavelength on the short wavelength side of the wavelength spectrum of the light emitted from the green EL element 1G is longer than the 20% reflected wavelength at the average reflectance 132 of S-polarized light and P-polarized light that form an angle of incidence of θa+θp+θn of the blue reflecting dichroic film 6B by the wavelength width denoted by reference character C in the figure.

Furthermore a half-value intensity wavelength on the long wavelength side of the wavelength spectrum of the light emitted from the green EL element 1G is shorter than the 20% reflected wavelength at the average reflectance 113 of S-polarized light and P-polarized light that form an angle of incidence of θa−θp−θn of the red reflecting dichroic film 6R by the wavelength width denoted by reference character D in the figure.

This structure reduces the wavelength band of the light emitted from the EL element crossing over the separating wavelength band of the dichroic film caused by a fluctuation of the angle θp of the principal ray with respect to the normal line of the EL element depending on the position of the image modulation area, and thereby avoids the problem that color reproducibility varies depending on the position at which the image is projected onto the screen 3.

Furthermore, when polarized EL elements which emit polarized light whose polarization direction is perpendicular to the plane on which three color beams are combined of the wavelength-combining prism 6 preferentially over polarized light whose polarization direction is in parallel to the above-described plane are used as the three EL elements 1R, 1G and 1B, the light emitted from the red EL element 1R is led to the projection lens 2 through reflection on the red reflecting dichroic film 6R that reflects the red light and transmits the green light and blue light and transmission through the blue reflecting dichroic film 6B that reflects the blue light and transmits the green light and red light. Furthermore, the light emitted from the blue EL element 1B is led to the projection lens 2 through reflection on the blue reflecting dichroic film 6B and transmission through the red reflecting dichroic film 6B. Furthermore, the light emitted from the green EL element 1G is led to the projection lens 2 by transmitting it pass through the red reflecting dichroic film 6B and the blue reflecting dichroic film 6B.

Then, in a case where, as described above the light beams emitted from the three EL elements 1R, 1G and 1B are combined by the wavelength-combining prism 6 and projected onto the object by the projection lens 2 to display an additive color mixture image, when the angle formed by the normal lines of the dichroic films with respect to the optical axis of the projection lens 2 is θa, the angle formed by the principal ray with respect to the normal line of the emission plane of the EL element at the position at the maximum object height from the optical axis of the projection lens 2 in the emission region of the EL element within the plane on which the three color beams are combined is θp and the half angle at which the lens pupil that captures the light emitted from the projection lens 2 observes the position at the maximum object height from the optical axis of the projection lens 2 of the emission region of the EL element is θn, the following results are obtained.

That is, a half-value intensity wavelength on the short wavelength side of the wavelength spectrum of the light emitted from the red EL element 1R is longer than the 80% reflected wavelength of S-polarized light at an angle of incidence of θa+θp+θn with respect to the normal line of the red reflecting dichroic film 6R.

Furthermore, a half-value intensity wavelength on the long wavelength side of the wavelength spectrum of the light emitted from the blue EL element 1B is shorter than the 80% reflected wavelength of S-polarized light at an angle of incidence of θa−θp−θn with respect to the normal line of the blue reflecting dichroic film 6B.

Furthermore, a half-value intensity wavelength on the short wavelength side of the wavelength spectrum of the light emitted from the green EL element 1G is longer than the 20% reflected wavelength of S-polarized light at an angle of incidence of θa+θp+θn with respect to the normal line of the blue reflecting dichroic film 6B. Furthermore a half-value intensity wavelength on the long wavelength side of the wavelength spectrum of the light emitted from the green EL element 1G is shorter than the 20% reflected wavelength of S-polarized light at an angle of incidence of θa−θp−θn with respect of the normal line of the red reflecting dichroic film 6R.

This can suppress the difference in color reproducibility depending on the position of the projected image to a minimum level and realize uniform color reproduction on the entire display image.

As described above, according to Embodiments 1 and 2 above, the use of the projection lens, having a characteristic non-telecentric toward a luminous object with principal rays that pass through the median point of the aperture pupil for capturing diffused emitted light from the pixels of the EL element (organic EL element) converging when seen from the EL element at the pixel position at which the object height on the EL element from the optical axis of the projection lens reaches a maximum makes it possible to project an image with uniform illumination and display an image whose end is substantially bright. Furthermore, it is possible to design a more compact projection lens with a wider field angle resulting in a system of a projection type image display apparatus which can be manufactured at lower cost for the above-described added value.

The configurations shown in Embodiments 1 and 2 are not limited to a projector, but also applicable to a head mounted display or head up display, etc., used to observe virtual images of an EL element.

(Embodiment 3)

Figure 8:
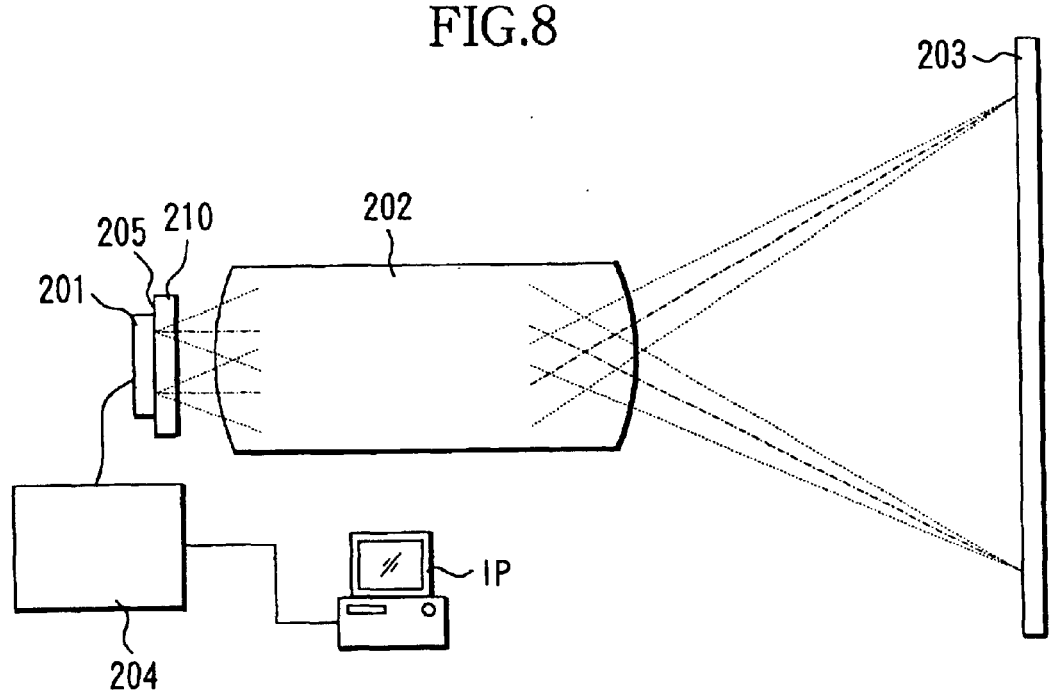
FIG. 8 is a sectional view of a main optical system of a projector which is Embodiment 3 of the present invention.

FIG. 8 is a sectional view of a main optical system of a projector (projection type image display apparatus) which is Embodiment 3 of the present invention.

Reference numeral 201 denotes an electroluminescence (EL) element that emits light including image information and is an organic EL element in this embodiment as will be described later. This EL element 201 comprises a plurality of pixels that emit light including image information as a light pattern signal. The detailed structure of this EL element 201 will be described later.

Reference numeral 210 denotes a glass substrate that holds a film structure of the EL element 201. On the electroluminescent film side of the glass substrate 210 is provided a light emission direction control section 205 with two-dimensionally arranged microprism structures as light emission direction control elements.

Reference numeral 204 denotes a controller made up of a CPU, etc., which electrically controls the EL element 201 according to image signals from an image signal providing apparatus IP such as a personal computer, DVD player, VCR, video camera, TV, unit of an antenna and tuner that receive image signals. The EL element 201 emits light patterned based on the electrical signals from the controller 204.

The light emitted from the EL element 201 is captured by a projection lens 202 and projected onto a screen 203. The surface of the screen 203 has a light diffusion characteristic and the observer can recognize the image by viewing the light diffused and reflected by this screen 203.

The screen 203 may be either of the above-described reflection type or a transmission type. In both cases, using the screen having at least a predetermined diffusion characteristic, the apparatus can function as a display apparatus which recognizes the image by directly viewing the screen 203.

(Embodiment 4)

Figure 9:
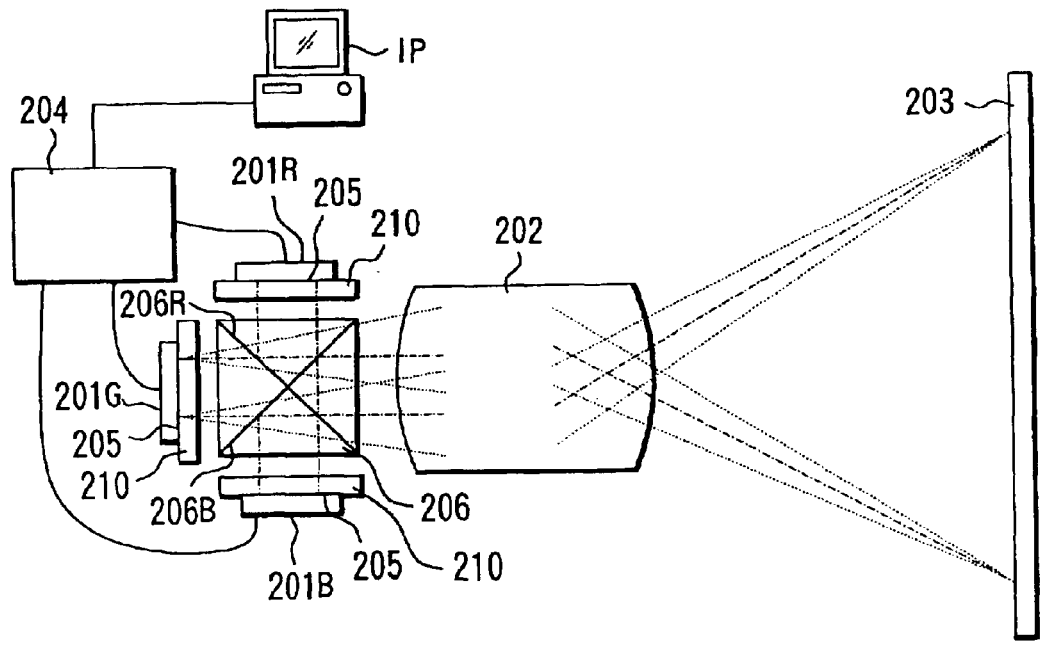
FIG. 9 is a sectional view of a main optical system of a projector which is Embodiment 4 of the present invention.

FIG. 9 is a sectional view of a main optical system of a projector (projection type image display apparatus) which is Embodiment 4 of the present invention.

Reference numerals 201R, 201G and 201B are EL elements that emit color light beams of red, green and blue which are three primary colors for an additive color mixture image and are organic EL elements in this embodiment as will be described later. Each of the EL elements 201R, 201G and 201B comprises a plurality of pixels which emit light including image information as light pattern information. A controller 204 sends electric signals to the EL elements 201R, 201G and 201B according to image signals input from an image signal providing apparatus IP (the same as described in Embodiment 3) and controls these EL elements 201R, 201G and 201B. The EL elements 201R, 201G and 201B emit color light beams that they handle respectively based on the electric signals from the controller 204.

A specific configuration of the EL elements 201R, 201G and 201B will be described later.

Reference numeral 210 denotes a glass substrate that holds the film structure of each EL element 201R, 201G and 201B. On the electroluminescent film side of the glass substrate 210 is provided a light emission direction control section 205 with two-dimensionally arranged microprism structures as light emission direction control elements.

2The light beams emitted from the EL elements 201R, 201G and 201B are combined by a wavelength-combining (color-combining) prism 206. The wavelength-combining prism 206 is generally called a "cross dichroic prism" and comprises a dichroic waveband separating film (red reflecting dichroic film) 206R that reflects the red light and transmits the green light and blue light pass and a dichroic waveband separating film (blue reflecting dichroic film) 206B that reflects the blue light and transmits the green light and red light in a crossing arrangement. Therefore, the green light is transmitted without being affected by the wavelength-combining prism 206.

By using this wavelength-combining prism 206, the light (image information light) emitted from the EL element 201R handling the red color is deflected toward the projection lens 202 by the blue reflecting dichroic film 206R and the light (image information light) emitted from the EL element 201B handling the blue color to be deflected toward the projection lens 202 by the blue reflecting dichroic film 206B. On the other hand, the light (image information light) emitted from the EL element 201G handling the green color advances toward the projection lens 202 without receiving a deflecting effect.

The plurality of pixels provided for the EL elements 201R, 201G and 201B are mechanically or electrically adjusted so that the beams from the corresponding pixels overlap with one another on the screen 203 with predetermined accuracy. Furthermore, instead of the wavelength-combining prism 206, a 3-piece prism or 4-piece prism which is often used in a video received light color-separating optical system may be employed as well as the cross dichroic prism in the figure.

The light modulated by the EL elements 1R, 1G and 1B and color-combined by the wavelength-combining prism 206 is projected onto the screen 203 by the projection lens 202.

The surface of the screen 203 has a light diffusion characteristic and the observer can recognize the image by viewing the light diffused and reflected by this screen 203.

The screen 203 may be either of the above-described reflection type or a transmission type. In both cases, using the screen having at least a predetermined diffusion characteristic, the apparatus can function as an image display system which recognizes the image by directly viewing the screen 203.

(EL element)

Then, the structures of the EL elements used in Embodiment 3 will be explained using FIGS. 10(A) and (B). As shown in FIG. 10(B), the basic structure of the EL element 201 comprises a transparent glass substrate 210, in one side of which a microprism 220 for improving the directivity of the projection lens 202 toward the pupil is embedded and formed, as the base material (the detailed structure of the microprism 220 will be described later) and luminescent materials 211, 212 and 213 sandwiched between an ITO (indium-tin oxide) transparent thin film electrode 214 and metal thin film electrode 215. In order to efficiently inject hole carriers into the luminescent materials 211, 212 and 213, a hole transport layer 216 is placed between the ITO transparent thin film electrode 214 and luminescent materials 211, 212 and 213.

When holes are injected from the ITO transparent thin film electrode 214 into the luminescent materials 211, 212 and 213 through the hole transport layer 216 and electrons are injected from the metal thin film electrode 215, the injected holes and electrons are re-combined in the luminescent materials 211, 212 and 213, producing light emission.

Furthermore, when used as a modulation light source of the projection type image display apparatus, as a method for increasing the rate of capturing emitted light by the projection lens 202 and increasing the photoelectrical conversion efficiency of external light emission, a dielectric multilayer reflecting mirror 217 provided outside the ITO transparent thin film electrode 214 and the light reflecting plane of the metal thin film electrode 215 constitute a light resonance structure. In this way, resonance causes the light emission direction to have directivity in the direction perpendicular to the glass substrate 210 though the resonance may not reach so far as a state in which induced emission action occurs.

This is the basic structure of the EL element 201 and each emission pixel is formed by the ITO transparent thin film electrode 214 and metal thin film electrode 215 arranged in a wiring matrix form.

The luminescent layer has a phosphorescent material that emits light by triplet state excitons as the luminous body.

The luminescent colors such as red, green and blue are determined by a phosphorescent material which is a luminescent material arranged in the luminescent layer, for example, a hetero-molecular structure of iridium complex and a derivative material for transporting charge carriers.

Figure 10:
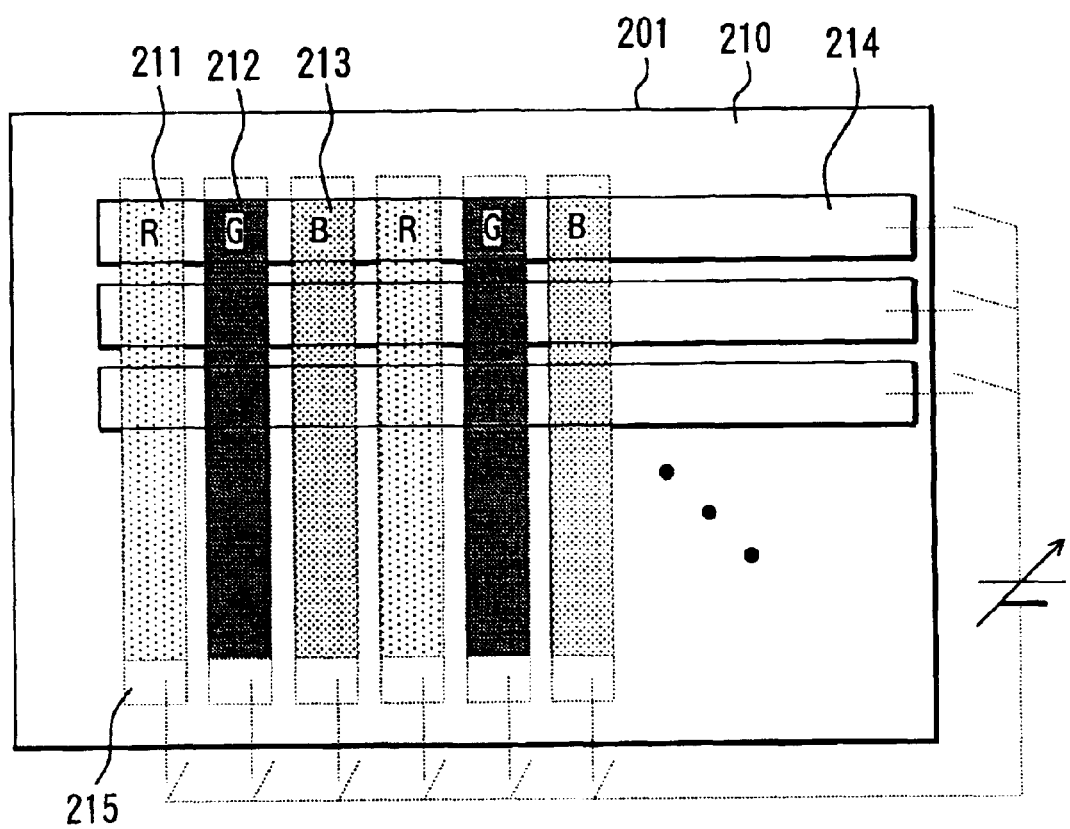
FIGS. 10(A) and (B) are schematic views of main parts of an EL element used in Embodiment 3.
Figure 10:
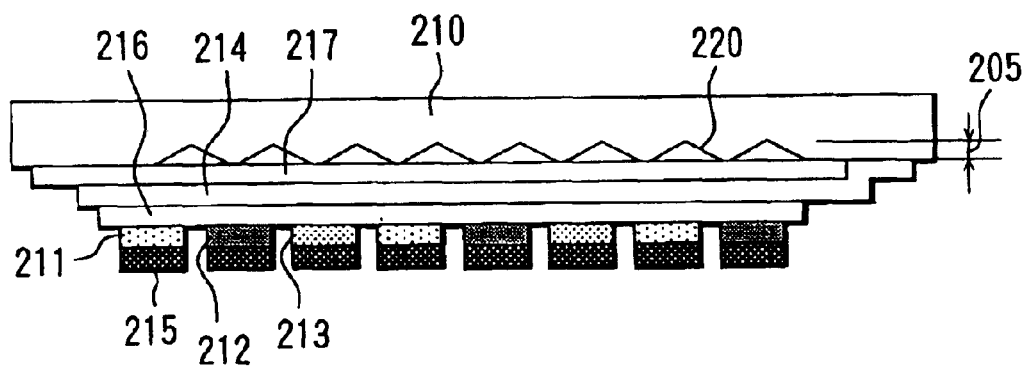

As shown in FIG. 10(A), the EL element 201 that expresses a full color image is realized by placing the luminescent material 211 handling red light, luminescent material 212 handling green light and luminescent material 213 handling blue light by turns.

On the other hand, patterning of the luminescent materials 211, 212 and 213 is generally performed using a method of coating a fluorescent material onto a substrate using a vapor deposition method. That is, to create the EL element 201 with three primary color emission pixels, parts requiring no coating are masked for each color by resist patterning, the luminescent materials of three primary colors (RGB) are coated sequentially by a lift-off method and a pattern can be thereby placed.

Figure 11:
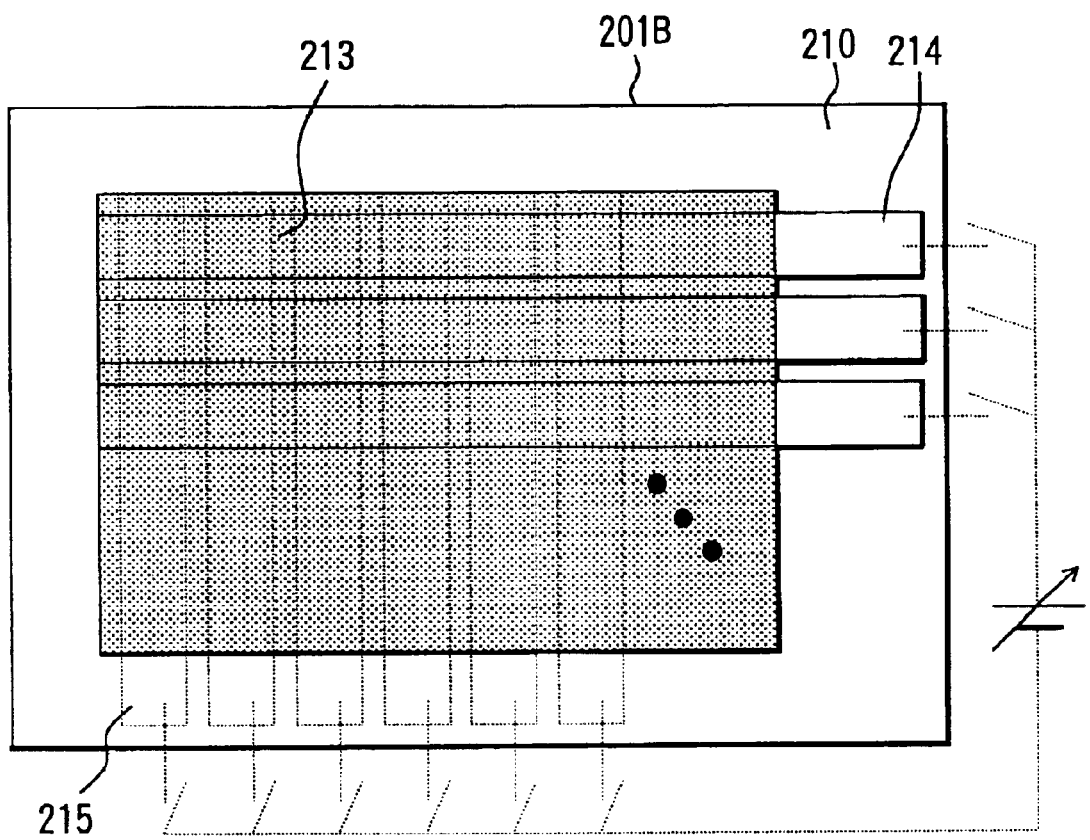
FIGS. 11(A) and (B) are schematic views of main parts of an EL element used in Embodiment 4.
Figure 11:
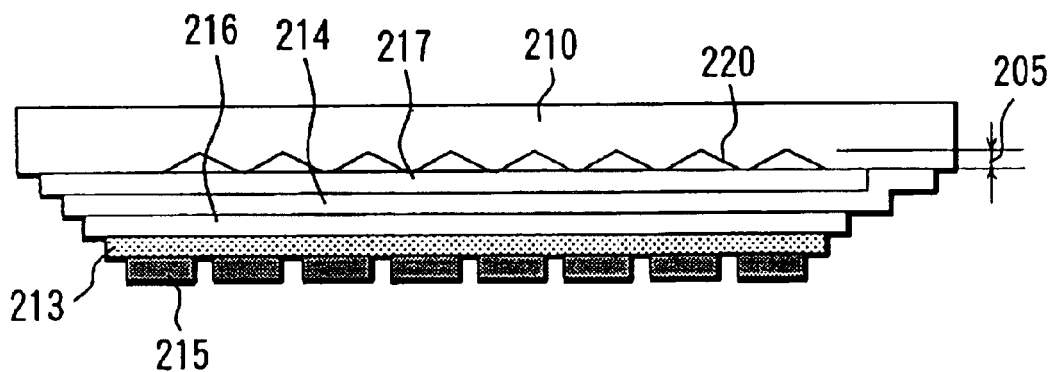

As shown in FIGS. 11(A) and 11(B), the structures of the EL elements 201R, 201G and 201B used in Embodiment 4 consist of those explained in Embodiment 3 without the structure in which the patterns of the luminescent materials of three primary colors are placed. The figures show only the blue EL element 201B, but the other color EL elements are also constructed in the same way.

The EL element 201R that emits red light has the luminescent material 211 that emits red light and the EL element 201G that emits green light has the luminescent material 212 that emits green light. Furthermore, the EL element 201B that emits blue light has the luminescent material 213 that emits blue light.

In this embodiment, an iridium complex is used as a luminous body, and uses a type of the iridium complex whose potential energy gap has been changed by molecules obtained by substituting a part of a complex base the complex structure or molecules, obtained by substituting terminal atoms for an emission wavelength. Furthermore, it is also possible to adopt a film structure improving the efficiency of generating excitons by forming a double hetero potential structure having an electron transport layer also serving as a hole blocking layer and a hole transport layer also serving as an electron blocking.

For the phosphorescent material used here, light emission is started with pulse injection into charge carriers and the time after peak light emission until the light emission is attenuated to a half amount of light emission is 1 millisecond or less at the longest. The light emission delay attenuation time of a phosphorescent material using an iridium complex also changes depending on the film thickness of the luminescent layer. When the film thickness of the luminescent layer is assumed to be approximately 30 nm, phosphorescence takes place in a light emission half attenuation time of 10 microseconds or less. Here, if a phosphorescent material or element structure whose phosphorescent light emission half attenuation time is by far longer than 1 millisecond, producing such a large light emission delay as to exceed 10 milliseconds is used, it will take a time of several tens of milliseconds until the light goes off, which is recognized as an afterimage in terms of visual recognition. When a moving image is displayed, this causes a problem of a so-called movement tailing phenomenon. Therefore, it is preferable to use a phosphorescent material or element structure whose phosphorescent light emission half attenuation time is shorter than 1 millisecond.

On the other hand, since the phosphorescent light emitted from an excited triplet state has quantum conversion efficiency theoretically four times that of fluorescent light emitted from an excited singlet state, a larger amount of light emitted can be converted with respect to the energy of power input, providing high luminance efficiency, and therefore using the EL element as the modulation light source of the projection type image display apparatus makes it possible to obtain a bright displayed image more easily, which is effective in improving the quality of the projected image.

Next, a structure of a light emission direction control section 205, in one side of which the microprism 220 according to Embodiments 3 and 4 are embedded and formed will be explained using FIGS. 12(A), (B) and (C). FIGS. 12(A), (B) and (C) region top view, side view and front view of the light emission direction control section 205, respectively.

The microprism 220 has a pentahedron pyramid shape and is embedded in a transparent film substrate 235 in such a way that the vertex of each pyramid is positioned in the deepest part in the thickness direction of the transparent film substrate 235. The bottom surface of the pyramid is exposed to one side of the transparent film substrate 235. The microprisms 220 are arranged two-dimensionally in such a way that the sides of the bottom surfaces are connected to one another.

The sequence of points in the figure indicates that the microprisms 220 are arranged from there on continuously.

Furthermore, the microprism 220 is made of a material having a higher refractive index than that of the transparent film substrate 235. The angle of the slope surface of the pyramid-shaped microprism 220 with respect to the bottom surface depends on parameters such as the wavelength of emitted light, refractive index of the outermost film on emission side of the electroluminescent film, difference in the refractive indices between the transparent film substrate 235 and microprism 220 and NA (numerical aperture) of the projection lens 202, and the angle of the slope surface is designed to become gentler, that is, the angle with respect to the bottom surface is designed to become acuter as the difference in the refractive indices between the transparent film substrate 235 and microprism 220 increases.

The method for creating the light emission direction control section 205 will be explained. When low-melting point glass is used as the transparent film substrate 235, a pyramid-shaped concave section is formed in the transparent film substrate 235 by means of molding, solvent coating is performed on the transparent film substrate 235 using a spin coating method with an organic polymeric material with high refractive index dissolved in the solvent and the microprism 220 is embedded. Furthermore, when the solvent is vaporized and the surface thereby becomes uneven, projections are removed by grinding.

Furthermore, when a plastic material is used as the transparent film substrate 235, the pyramid-shaped concave section is formed in the transparent film substrate 235 by means of molding as in the case where glass is used and solvent coating is performed on the transparent film substrate 235 using a spin coating method with an organic polymeric material of high refractive index dissolved in the solvent. Here, it is preferable to use the organic polymeric material dissolved in the solvent which is different from the plastic material in an SP value (solubility parameter value) whenever possible to prevent the plastic material from being melted. For example, when polyphenyl-based resin (SP value 10 to 11) is used as the plastic material of the transparent film substrate 235, when forming the microprism 220, it is possible to dissolve polyvinyl-based resin (SP value: approximately 9) in a solvent such as toluene and acetone (SP value: approximately 9) to perform solvent coating and thereby prevent melting of the interface.

Then, the structure of the EL element with the microprism 220 will be explained using FIG. 13 and FIG. 14.

Figure 13:
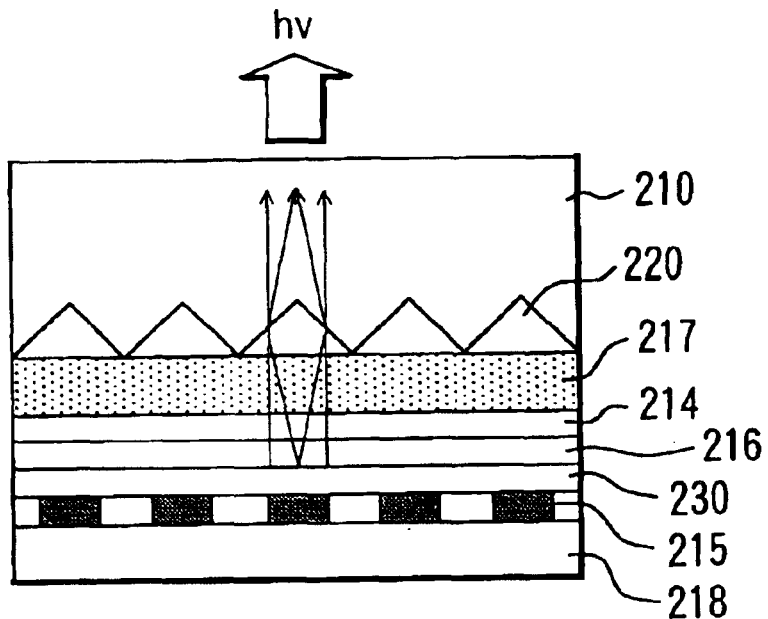
FIG. 13 illustrates a structure of main parts of an example of an EL element having microprisms.

FIG. 13 shows an EL element with an electroluminescent film structure formed on the glass substrate 210 which incorporates the microprisms 220. Films are from top to bottom in FIG. 13 in terms of the manufacturing process.

First, a dielectric multilayer reflecting mirror 217 having a dielectric multilayer film structure for causing Bragg reflection is formed on the glass substrate 210 in which the microprisms 220 are embedded and arranged two-dimensionally.

Then, an ITO transparent thin film electrode 214 made of ITO and divided for every pixel row of a pattern (not shown) to modulate an image for injecting holes, a hole transport layer 216 for injecting holes into a luminescent emission layer 230, a metal thin film electrode 215 divided for each pixel column to modulate an image for injecting electrons and a protective layer 218 for protecting the element from gases in the atmosphere are formed in this order.

Light which is generated when charge carriers of electrons and holes are injected into the luminescent layer 230 is deflected by the interface of the microprism 220 and emitted out of the EL element in such a way that luminous fluxes partially overlap one another as indicated by the arrows in the figure.

To make it easier to understand the film structure, this figure describes each film as if having a large thickness. However, the film thickness from the dielectric multilayer reflecting mirror 217 to the metal thin film electrode 215 is 1 μm or less and the size of the microprism 220 is on the order of 10 μm depending on the modulation pixel pitch, and therefore only an extremely small amount of light which has been emitted from each pixel of the luminescent layer 30 is incident upon the microprism 220 corresponding to the neighboring pixel. Therefore, modulation crosstalk among pixels hardly occurs.

Using such design that the region where luminous fluxes are overlapped with one another by the microprisms 220 is principally led into the pupil of the projection lens 202 can increase the amount of light emitted from the EL element captured by the projection lens 202, increase illumination projection onto the screen 203 and display a brighter image.

Figure 14:
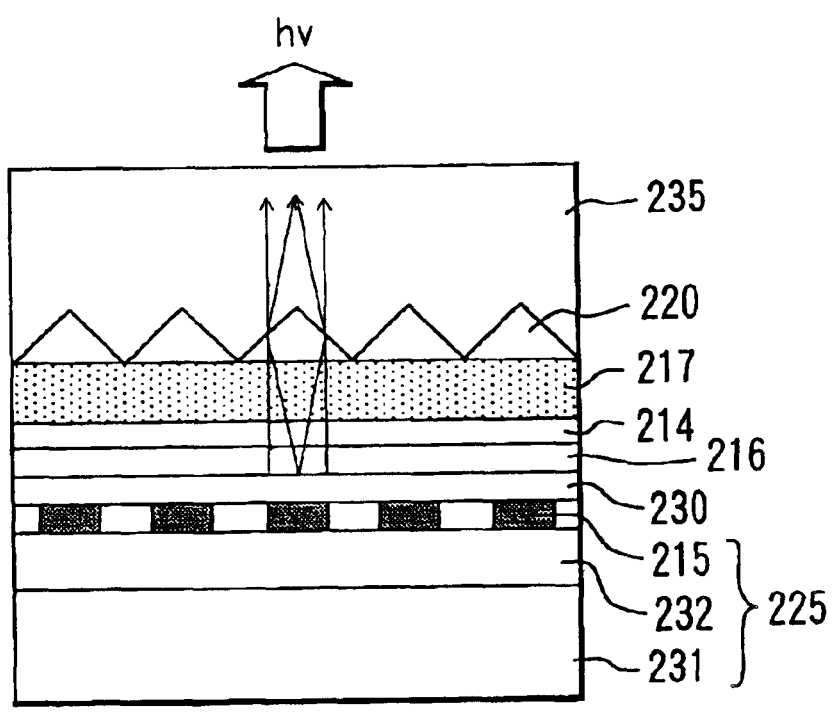
FIG. 14 illustrates a structure of main parts of another example of an EL element having microprisms.

FIG. 14 shows a structure including an EL element made up of an electroluminescent film structure formed on a silicon IC chip 225 joined with a transparent film substrate 235 having microprisms 220. Films are formed from bottom to top in FIG. 14 in terms of the manufacturing process.

First, a logic circuit layer 232 which controls light emission of the EL element is formed on a silicon substrate 231, a metal thin film electrode 215 divided into portions for each pixel to modulate the image for injecting electrons is embedded thereupon and in this way the silicon IC chip 225 is formed.

Then, on the silicon IC chip 225, the luminescent layer 230 in which excitons are formed with electrons and holes and emits fluorescent or phosphorescent light by re-combining them, the hole transport layer 216 for injecting holes into the luminescent layer, the ITO transparent thin film electrode 214 made of ITO for injecting holes and the dielectric multilayer reflecting mirror 217 having a dielectric multilayer film structure for causing Bragg reflection are formed in this order. Furthermore, the transparent film substrate 235 in which microprisms 220 are embedded and arranged two-dimensionally is joined onto the dielectric multilayer reflecting mirror 217.

Light which is generated when charge carriers of electrons and holes are injected into the luminescent layer 230 is refracted by the interface of the microprism 220 and emitted out of the EL element in such a way that luminous fluxes partially overlap one another as indicated by the arrows in the figure.

To make it easier to understand each film configuration, this figure describes each film as if having a large thickness. However, the film thickness from the dielectric multilayer reflecting mirror 217 to the metal thin film electrode 215 is actually 1 μm or less and the size of the microprism 220 is on the order of 10 μm depending on the modulation pixel pitch. Therefore, only an extremely small amount of light which has been emitted from each pixel of the luminescent layer 230 is incident upon the microprism 220 corresponding to the neighboring pixel. Therefore, modulation crosstalk among pixels hardly occurs.

Using such design that the region where luminous fluxes are overlapped with one another by the microprisms 220 is principally led into the pupil of the projection lens 202 can increase the amount of light emitted from the EL element captured by the projection lens 202. This can increase projection illumination of the image onto the screen 203 and display a brighter image.

Then, positional and size relationships between the individual microprisms 220 and emission pixels will be explained using FIG. 15 and FIG. 16.

Figure 15:
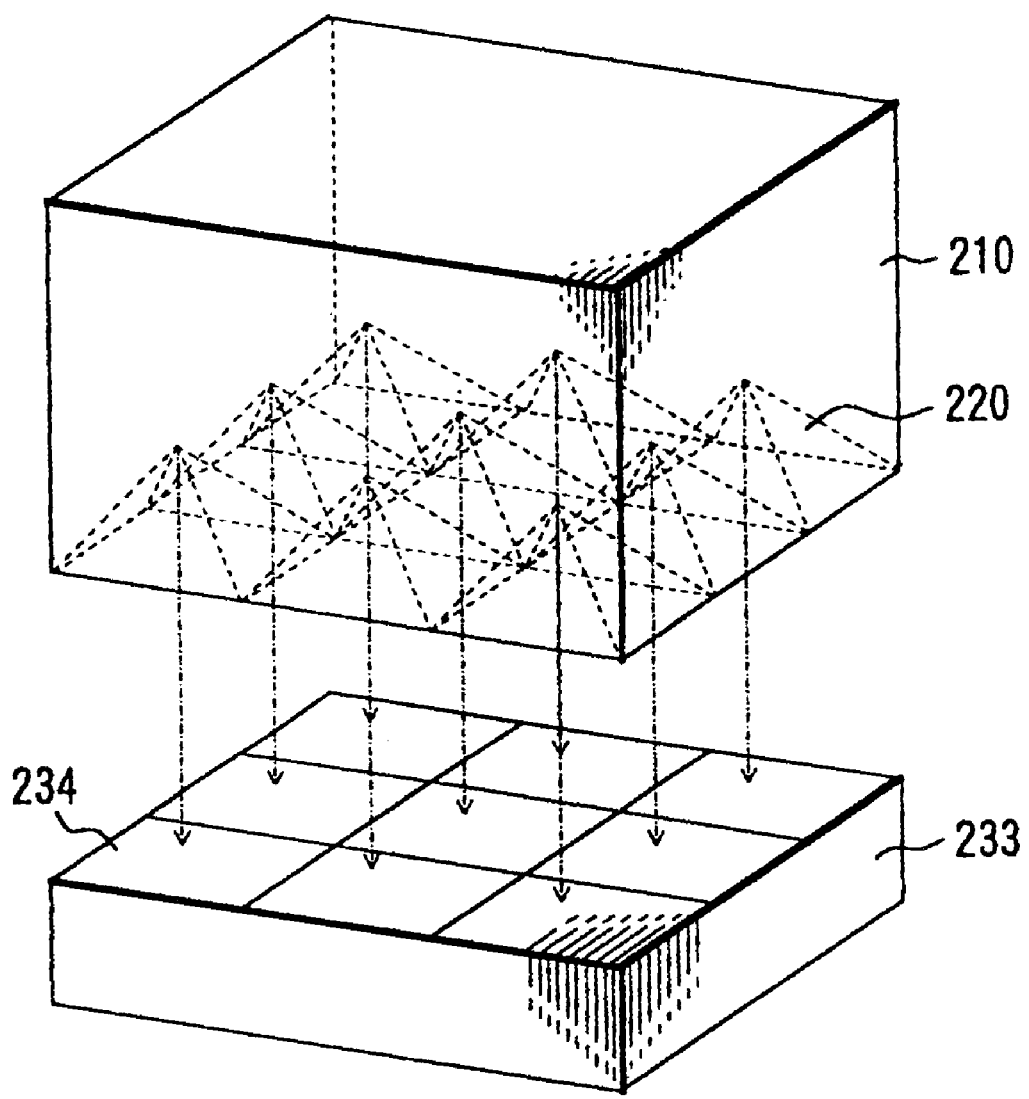
FIG. 15 illustrates an example of a positional relationship between microprisms and modulation pixels of an EL element.

FIG. 15 shows an example of a case where the two-dimensional array pitch size of pixels 234 in the film structure section 233 of the EL element is equivalent to the two-dimensional array pitch size of the bottom of the microprism 220. In this case, as shown in FIG. 15, the system is constructed in such a way that the positions of vertices of the microprisms 220 align with the positions of median points or centers of the respective pixels 234 at coordinates on the plane of arrangement. With regard to alignment errors, it is of course preferable to have high accuracy and it is preferable to perform alignment with the accuracy of ⅕ of the pixel pitch or smaller.

Since pixels of the EL element become surface light-emitting pixels which are dependent on the electrode shape, the effect of light emission directivity control by the microprisms 220 is high in the central portion of each pixel. On the other hand, at the end of each pixel, the ratio of oblique incidence luminous flux to the microprism 220 increases, and therefore the effect of overlapping of luminous fluxes decreases. Thus, it is not necessary to exactly align the peripheral section of the pixel 234 with the bottom surface of the microprism 220 and if alignment is performed with the accuracy ⅕ or less of the pixel pitch, almost no changes will occur in the effect of the light emission directivity control.

Figure 16:
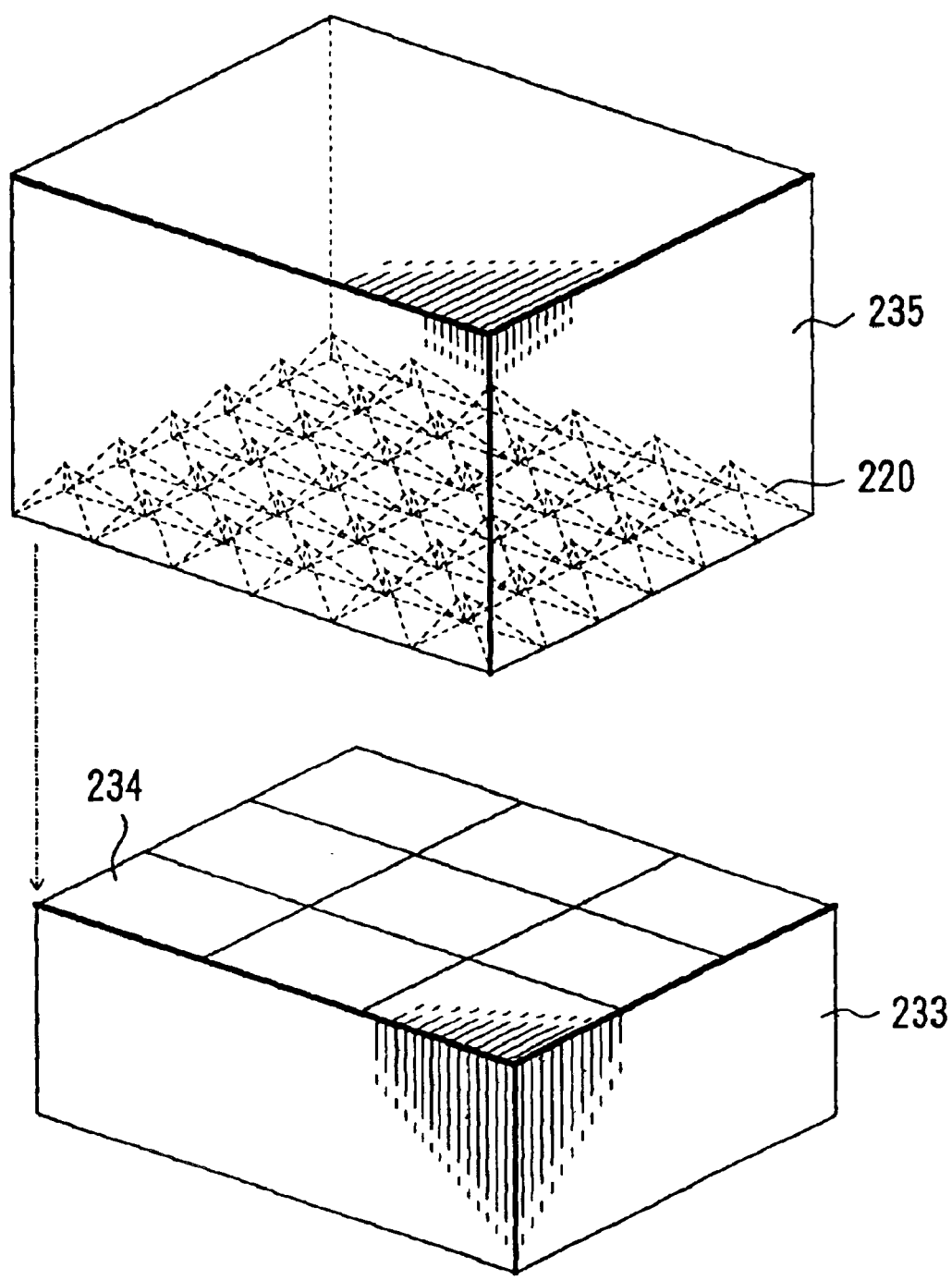
FIG. 16 illustrates another example of a positional relationship between microprisms and modulation pixels of an EL element.

FIG. 16 shows an example of a case where the two-dimensional array pitch size of the bottom surface of the microprism 220 is ½ of the two-dimensional array pitch size of the pixel 234 of the film structure section 233 of the EL element. As shown in FIG. 16, the transparent film substrate 235 with the microprisms 220 is simply joined without alignment.

Here, the microprisms 220 and pixels 234 are individually manufactured in a random positional relationship. However, since the relation of the two-dimensional array pitch size of the bottom surface of the microprism 220 being ½ of the two-dimensional array pitch size of the pixel 234 is maintained, light crosstalk occurs between the neighboring pixels 234, but no crosstalk occurs in a distance equal to or greater than a half pixel. Moreover, since the microprism 220 having an area corresponding to areas of four pixels is provided, for the EL element which is a surface emission element, the efficiency of light emission directivity control is equivalent for each pixel, which suppresses variations in the brightness from one pixel to another. Furthermore, there is no need to join them after alignment, and therefore it is possible to join the transparent film substrate 235 (transparent film with microprisms) having the microprisms 220 to the film structure section 233 using a simple method such as simple lamination.

Furthermore, when the ratio of the two-dimensional array pitch size of the bottom surface of the microprism 220 to the two-dimensional array pitch size of the pixel 234 of the film structure section 233 is 1/N (N: positive integer), the amount of crosstalk between neighboring pixels decreases as N increases, and therefore it is possible to increase fine line contrast of the displayed image. The value of N can be increased by improving the manufacturing accuracy of the microprism 220.

Figure 17:
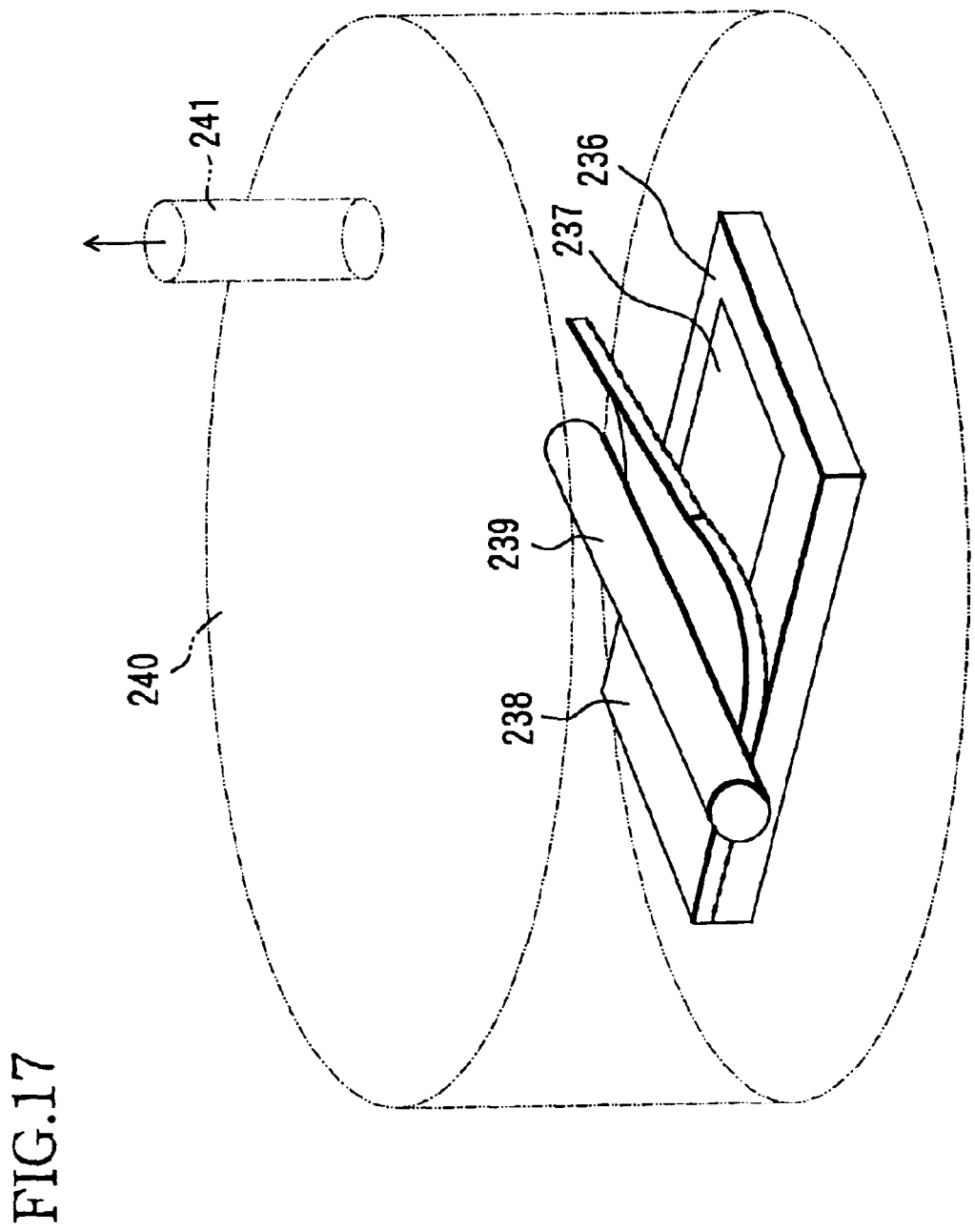
FIG. 17 illustrates an example of a method of connecting a microprism film and an EL element.

FIG. 17 shows an example of a method of laminating a transparent film with microprisms 238 incorporating the microprisms 220 over an EL element 236 in vacuum.

The pressure inside a vacuum chamber 240 is reduced to approximately 10 Torr (1.33322 kPa) or less through a vent 241 using a vacuum pump (not shown). The type of the EL element 236 shown in FIG. 14 with pixels is placed in this vacuum chamber 240 and the transparent film with microprisms 238 is laminated on the surface of an array modulation pixel region 237 of the EL element 236 while being pressed by a pressing roll 239.

Afterward, the atmosphere is introduced from the vent 241 into the vacuum chamber 240, and the EL element 236 is closely joined to the transparent film with microprisms 238 under the pressure of the atmosphere. After joining in close contact, the atmospheric pressure causes the transparent film with microprisms 238 to be pressed against the EL element 236 and an adhesive force is obtained with a frictional force in the contact section between both members. At this time, to prevent peeling due to invasion of the atmosphere from the joint edges, the periphery may be sealed with a sealant.

Furthermore, as a method for joining the transparent film with microprisms 238 to the EL element 236, it is also possible to adopt compatible adhesion using a solvent or adhesion through an adhesive layer of several microns in thickness. However, care is required for variations in the shape or damage to the film structure by the former compatible adhesion or deterioration of the quality of displayed images due to crosstalk between modulation pixels related to the film thickness of the adhesive layer of the latter.

Figure 18:
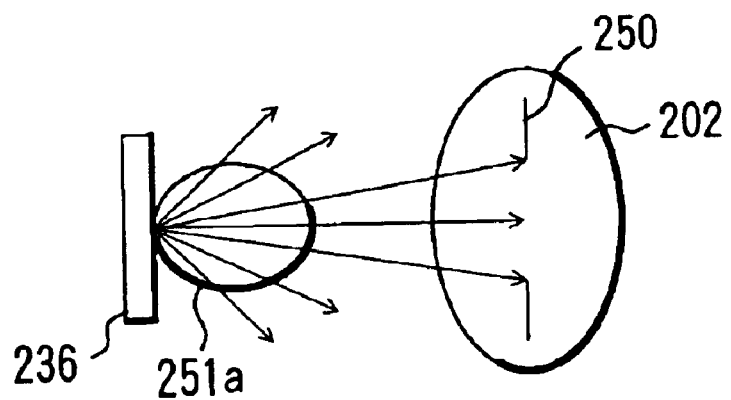
FIG. 18(A) illustrates projection illumination with no microprism and FIG. 18(B) illustrates an improvement of projection illumination using microprisms.
Figure 18:
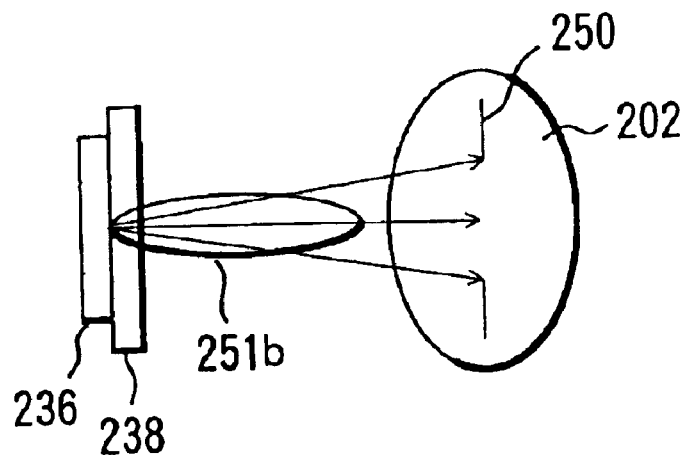

As explained above, Embodiments 3 and 4 provide a light emission direction control layer (transparent film with microprisms 238) in which microprism structures having pyramid-shaped pentahedrons as the refractive index boundary are arranged two-dimensionally on the emission side (position proximate to emission pixels) of the film structure of the EL element, and cause, as shown in FIG. 18(B), the optical path of the light emitted from the EL element 236 to be controlled and can thereby intensify the directivity as shown in each light emission directivity characteristic 251b.

This increases the amount of light that can be captured by the lens aperture pupil 250 of the projection lens 202 compared to a conventional structure as shown in FIG. 18(A) where the directivity of the light from the EL element 236 is low as shown in a light emission directivity characteristic 251a, and can thereby display a brighter image.

Then, the effective use of such emitted light lessens the need to excessively increase the light emission brightness of the EL element, can suppress heating of the EL element and suppress variations in the structure and characteristic of the organic thin film. Therefore, it is possible to suppress reduction of the luminance efficiency of the organic EL element and extend the life of the element.

As shown in Embodiments 3 and 4, when the screen is directly viewed using a display method whereby an image is projected onto a diffusive screen and the diffused light is recognized or when a system whereby light enters the eyes directly from a light source such as a head up display, head mounted display, etc., is constructed, the use of the microprism structure makes it possible to suppress variations in brightness because of a discontinuous brightness distribution in the light emission direction.

(Embodiment 5)

Figure 19:
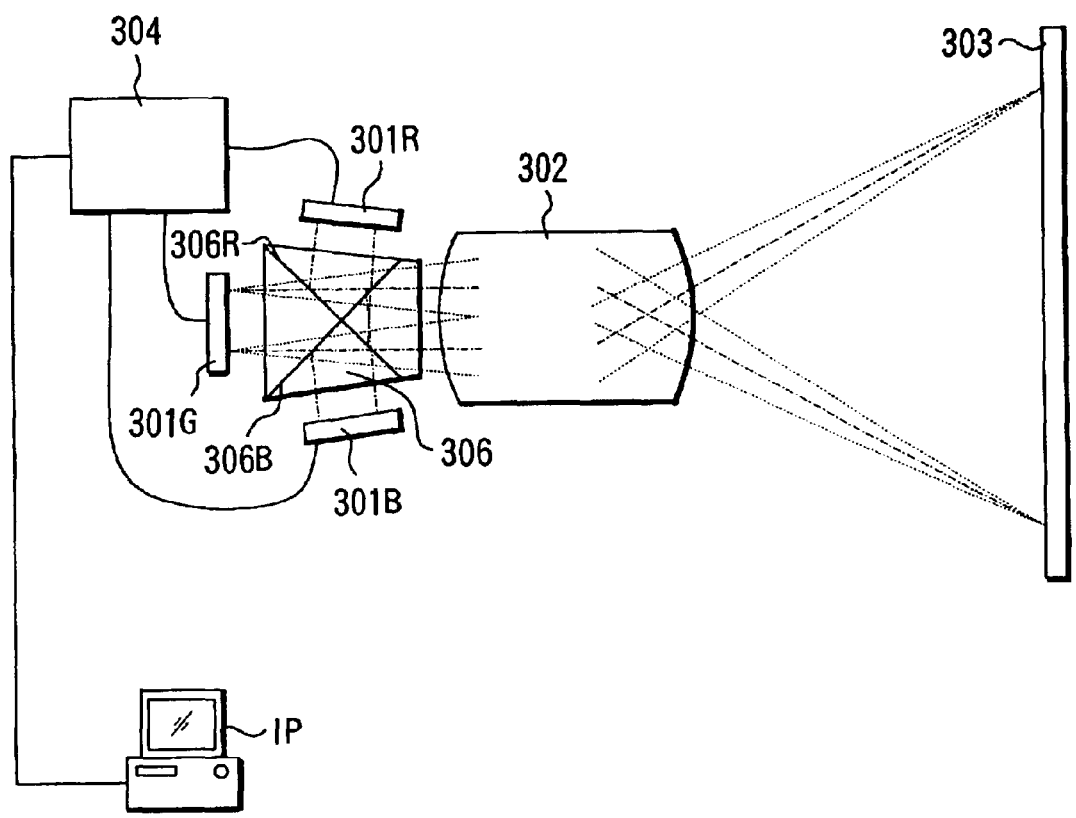
FIG. 19 is a sectional view of a main optical system of a projector which is Embodiment 5 of the present invention.

FIG. 19 is a sectional view of a main optical system of a projector (projection type image display apparatus) which is Embodiment 5 of the present invention.

Reference numerals 301R, 301G and 301B denote electroluminescence (EL) elements that emit color beams handling three primary colors of red, green and blue for an additive color mixture image, and are organic EL elements in this embodiment as will be described later. These EL elements 301R, 301G and 301B comprise a plurality of pixels emitted light including image information as light pattern information. A controller 304 sends electric signals tot he EL elements 301R, 301G and 301B according to image signals input from an image signal providing apparatus IP such as a personal computer, DVD player, VCR, video camera, TV and unit of an antenna and tuner that receive image information and controls these EL elements 301R, 301G and 301B. The EL elements 301R, 301G and 301B emit light beams they handle respectively based on the electric signals from the controller 304.

Specific structure of the EL elements 301R, 301G, 301B will be described later.

The light beams emitted from the EL elements 301R, 301G and 301B are combined by a wavelength-combining (color-combining) prism 306. The wavelength-combining prism 306 is generally called a "cross dichroic prism" and comprises a dichroic waveband separating film 306R that reflects the red light and transmits the green light and blue light pass and a dichroic waveband separating film 306B that reflects the blue light and transmits the green light and red light in a crossing arrangement. Therefore, the green light is transmitted without being affected by the wavelength-combining prism 306.

By using this wavelength-combining prism 306, the light (image information light) emitted from the EL element 301R handling the red color is deflected toward the projection lens 302 by the dichroic waveband separating film 306R and the light (image information light) emitted from the EL element 301B handling the blue color is deflected toward the projection lens 302 by the dichroic waveband separating film 306B. On the other hand, the light (image information light) emitted from the EL element 301G handling the green color advances toward the projection lens 302 without receiving a deflecting effect deflected.

The plurality of pixels provided for the EL elements 301R, 301G and 301B are mechanically or electrically adjusted so that the beams from the corresponding pixels overlap with one another on the screen 303 with predetermined accuracy. Furthermore, instead of the wavelength-combining prism 306, a 3-piece prism or 4-piece prism which is often used in a video received light color separating optical system can also be used as well as the cross dichroic prism in the figure.

The light modulated by the EL elements 301R, 301G and 301B and combined by the wavelength-combining prism 306 is projected onto the screen 303 by the projection lens 302.

The surface of the screen 303 has a light diffusion characteristic and the observer can recognize the image by viewing the light diffused and reflected by this screen 303.

The screen 303 may be either of the above-described reflection type or a transmission type. In both cases, using the screen having at least a predetermined diffusion characteristic, the apparatus can function as an image display system which recognizes the image by directly viewing the screen 303.

(EL Element)

Then, the structures of the EL elements used in this embodiment will be explained using FIGS. 20(A) and (B). The figures show only the blue EL element 301B, but the EL elements for other colors are constructed in the same way.

Figure 20:
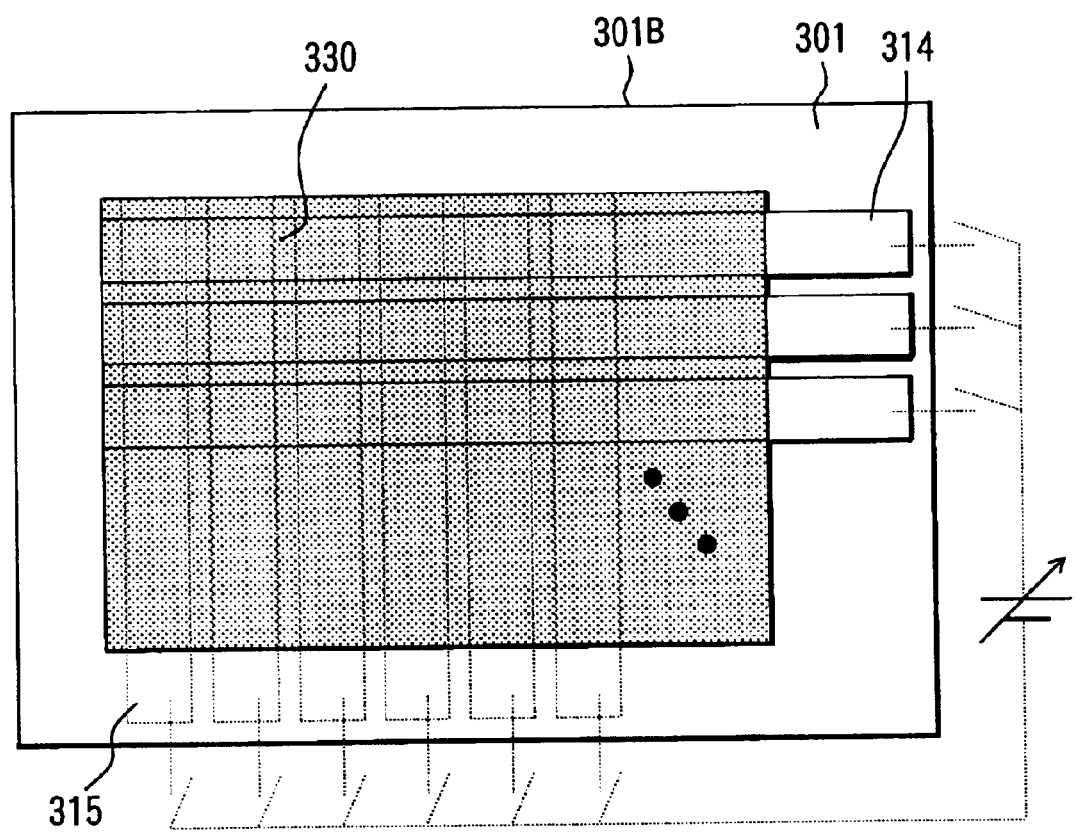
FIGS. 20(A) and (B) are schematic views of main parts of an EL element used in Embodiment 5.
Figure 20:
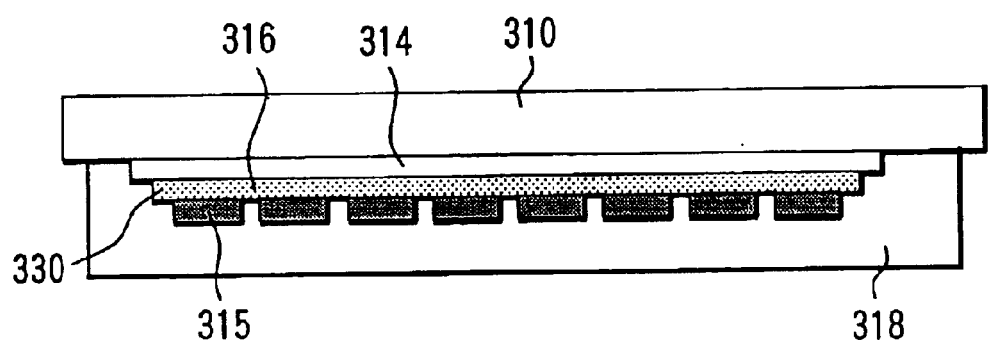

As shown in FIG. 20(B), the basic structure of the EL element 301B comprises a transparent glass substrate 310 as the base material and a thin film luminescent material 330 handling light emissions of red, green and blue colors sandwiched between an ITO (indium-tin oxide) transparent thin film electrode 314 and metal thin film electrode 315. In order to efficiently inject hole carriers into the luminescent material, a hole transport layer 316 is placed between the ITO transparent thin film electrode 314 and thin film luminescent material 330.

When holes are injected from the ITO transparent thin film electrode 314 into the thin film luminescent material 330 through the hole transport layer 316 and electrons are injected from the metal thin film electrode 315, the holes and electrons injected in the thin film luminescent material 330 are re-combined, producing light emission.

Furthermore, to prevent hydrolysis of organic materials, a protective layer 318 is provided to seal the film structure.

This is the basic structure of the EL element and each emission pixel is constructed of the ITO transparent thin film electrode 314 and metal thin film electrode 315 arranged in a wiring matrix form.

The luminescent layer has a fluorescent or phosphorescent material as well as the derivative for transporting electrons and holes, as a luminous body.

The luminescent colors such as red, green and blue are determined by a phosphorescent material which is a luminescent material arranged in the luminescent layer, for example, a hetero-molecular structure of iridium complex and a derivative material for transporting charge carriers.

The EL element 301R that emits red light has a luminescent material that emits the red light for the thin film luminescent material layer 330 and the EL element 301G that emits green light has a luminescent material that emits green light. Furthermore, the EL element 301B that emits blue light has a luminescent material that emits blue light.

The above-described embodiment uses an iridium complex as the luminous body and uses a type of the iridium complex whose potential energy gap is changed by molecules obtained by substituting a part of a complex base of the complex structure or molecules obtained by substituting terminal atoms for an emission wavelength. Furthermore, it is also possible to adopt a film structure improving the efficiency of generating excitons by forming a double hetero potential structure having an electron transport layer also serving as a hole blocking layer and a hole transport layer also serving as an electron blocking layer.

In FIG. 19, the wavelength-combining prism 306 has a prism shape with six or more external surfaces, and cross-arranged dichroic waveband separating films 306R and 306B (hereinafter referred to as "red reflecting dichroic film" and "blue reflecting dichroic film"), each of these dichroic films 306R and 306B forms an acute angle greater than 45° with respect to the optical axis of the projection lens. The wavelength-combining prism 306 includes four external surfaces perpendicular to the three optical axes including the optical axis of the projections lens 302 which are subject to deflection by the dichroic films 306R and 306B. Three of the four external surfaces are arranged substantially in parallel to the modulation emission planes of the above-described three EL elements 301R, 301G and 301B and the remaining one surface is arranged as the surface from which the color-combined light is emitted toward the projection lens 2.

That is, the image of the wavelength-combining prism 306 is understood as having a trapezoidal section of the wavelength-combining plane as shown in FIG. 19 and having a red reflecting dichroic film 306R and blue reflecting dichroic film 306B in a crossing arrangement so that the angles formed by the plane of the red reflecting dichroic film 306R and the plane of the blue reflecting dichroic film 306B with respect to the optical axis of the projection lens 302 are greater than 45° and smaller than 55°.

Figure 21:
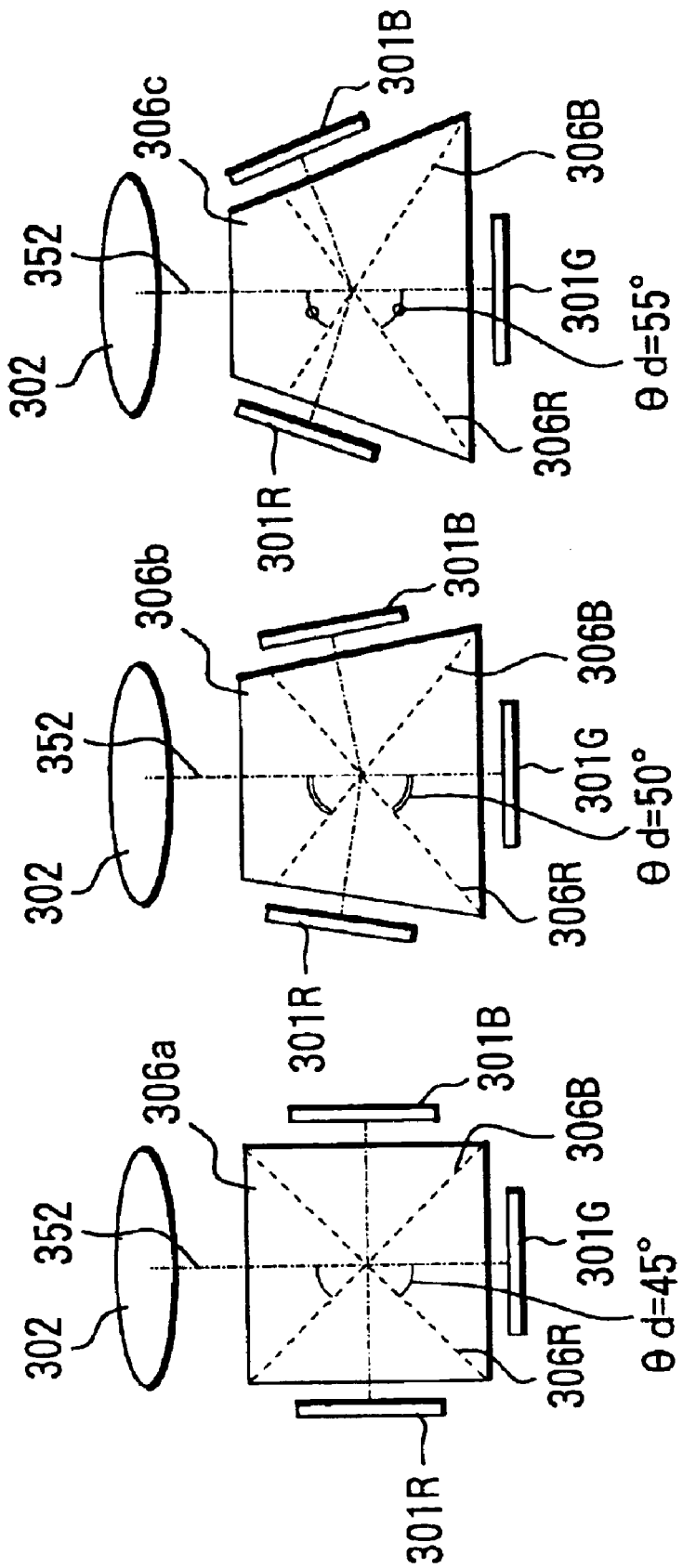
FIG. 21 illustrates a configuration of a cross dichroic prism used in Embodiment 5.

Then, the effects derived from the structure of this wavelength-combining prism 306 will be explained using FIG. 21 to FIG. 23.

FIGS. 21(A), (B) and (C) show the shapes of wavelength-combining prisms (denoted as 306a, 306b and 306c, respectively) whose dichroic films 306R and 306B form acute angles of 45°, 50° and 55° (hereinafter referred to as "θd") with respect to the optical axis of the projection lens 302 and the positions of the EL elements 301R, 301G and 301B.

In each wavelength-combining prism 306 in FIGS. 21(A), (B) and (C), the lengths of the normal lines from the ridges on which the dichroic film 306R and the dichroic film 306B cross each other to the respective prism extends surfaces that face the EL elements 301R, 301G and 301B of the respective colors are set to be substantially equal to each other.

This prevents the balance between red, green and blue colors from being upset to an extreme degree due to chromatic aberration of the projection lens 302. However, even if the length of the optical path of the prism glass varies depending on the color, that is, even if the lengths of the above-described normal lines are different in the strict sense, there will be no problem if the differences fall within the allowable designed range for the projection lens 302.

As θd increases from 45° to 55°, the EL elements 301R and 301B move closer to the projection lens 302 and the side of the upper base of the trapezoidal shape of the wavelength-combining prism 306 becomes shorter. This results in a lack of space for increasing the numerical aperture on the incident side from which the projection lens 302 observes the EL element, though depending on the size of the EL elements. Then, when θd exceeds 55°, it is difficult to arrange the EL elements and the size of the wavelength-combining prism 306 needs to be increased.

However, when the size of the wavelength-combining prism 306 is increased, the back focus of the projection lens 302 needs to be extended, which results in an increase in the size of the projection lens 302 and increase in the required space and manufacturing cost.

Figure 22:
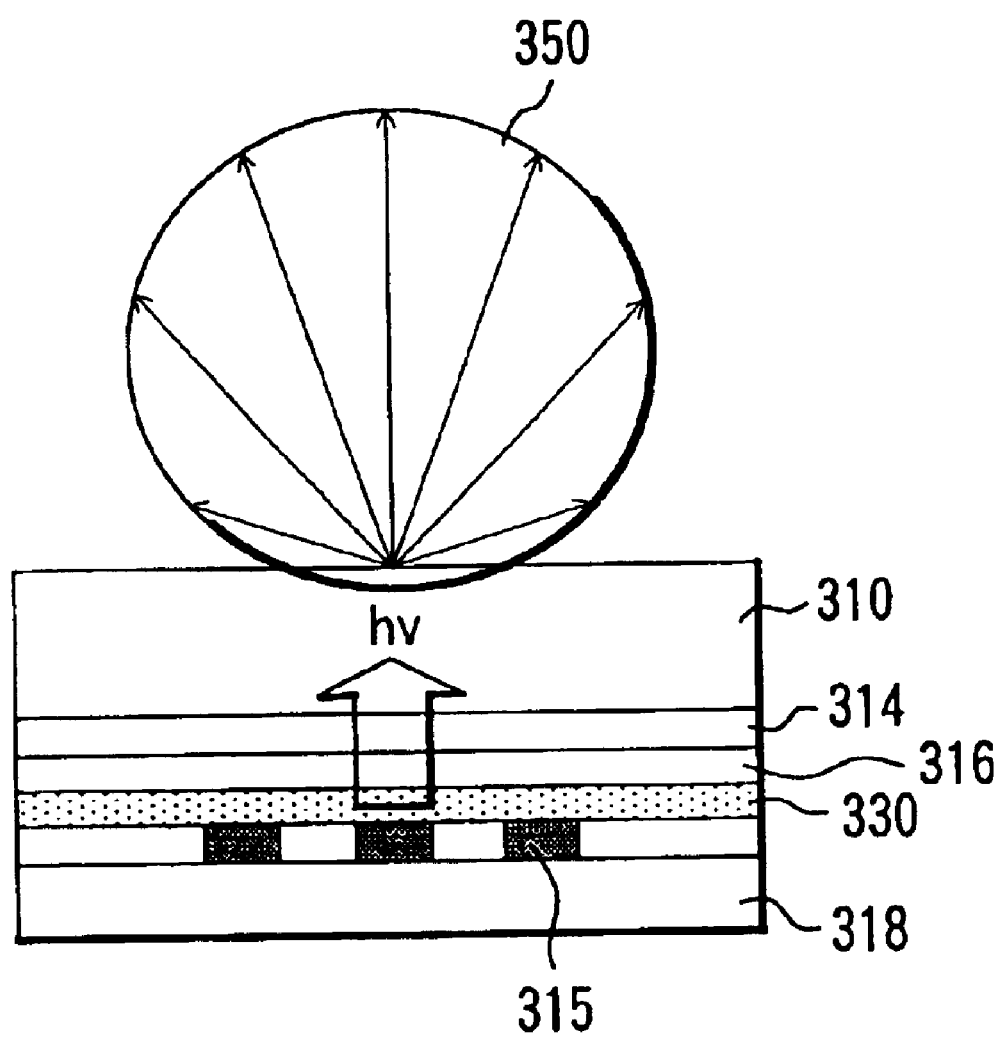
FIG. 22 illustrates a light emission characteristic of an EL element.
Figure 23:
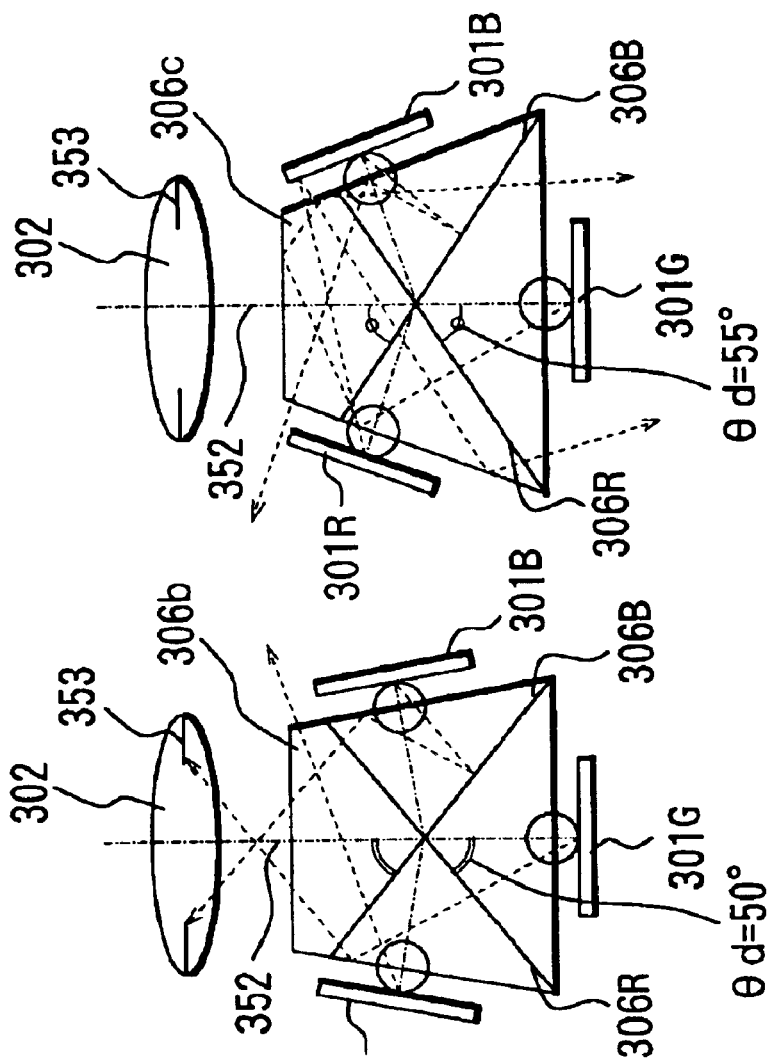
FIGS. 23(A), (B) and (C) schematically illustrate a ghost prevention effect using a cross dichroic prism.

On the other hand, the characteristic of light emission from the EL element 1 is as shown in FIG. 22. The EL element has a structure with an electroluminescent film structure formed on the glass substrate 310 and films are formed from top to bottom in the figure in terms of the manufacturing process.

First, a transparent thin film electrode 314 made of ITO and divided for every pixel row of a pattern (not shown) to modulate an image for injecting holes is formed on the glass substrate 10. Then, a hole transport layer 316 for injecting holes into a luminescent layer, the luminescent layer (thin film luminescent material layer) 330 that emits fluorescent or phosphorescent light by re-combining excitons formed of electrons and holes, a metal thin film electrode 315 divided for each pixel column to modulate an image for injecting electrons and a protective layer 318 for protecting the element from gases in the atmosphere are formed in this order.

Light hv which is generated when charge carriers of electrons and holes are injected into the luminescent layer 330 is emitted from the external surface of the glass substrate 310 out of the EL element due to the influence of a difference in refractive indices between the glass substrate 310 and the atmosphere as a main factor in a broad light emission distribution 350 in the spherical emission direction embracing the arrows in the figure.

Next, the influence on ghost projection produced by this characteristic will be explained using FIG. 23.

FIGS. 23(A), (B) and (C) show some beams emitted from the EL elements 301R, 301G and 301B when the wavelength-combining prisms (306a, 306b, 306c) whose θd is 45°, 50° and 55° respectively are provided. Each figure shows a system that projects light emitted from the EL elements 301R, 301G and 301B through the projection lens 302 and omits the screen 3.

In each of these figures, the circle described as being in contact with the EL element shows the light emission distribution 350 of the light emitted from the EL element. The light beams indicated by dotted lines are partially subject to Fresnel reflection on the refractive index interface of the wavelength-combining prism.

The light beam from the EL element 301R that emits red light is subject to reflection and deflection by the red reflecting dichroic film 306R and the light beam from the EL element 301B that emits blue light is subject to reflection and deflection by the blue reflecting dichroic film 306B.

When the wavelength-combining prism 306a whose θd is 45° is used, the light beam indicated by dotted lines as shown in FIG. 23(A) passes through the incident pupil 353 of the projection lens 302 and then transferred to a screen (not shown) and shown as a ghost image.

When the wavelength-combining prism 306b whose θd is 50° is used, the light beam indicated by dotted lines as shown in FIG. 23(B) is shielded by the incident pupil 353 of the projection lens 302, prevented from being transferred to the screen (not shown) and not shown as a ghost image.

When the wavelength-combining prism 306c whose θd is 55° is used, the light beam indicated by dotted lines as shown in FIG. 23(C) is emitted out of the region of the projection lens 302, prevented from being transferred to the screen (not shown) and not shown as a ghost image.

However, the light beams shown in FIGS. 23(A) to (C) are merely parts of the light beams emitted from the respective EL elements. Therefore, as explained in FIGS. 23(B) and (C), ghosts on the screen are not completely excluded as θd increases from 45° to 55°, but intensity of the light illuminating the ghost images actually weakens gradually. That is, when θd is increased from 45° to 55°, the amount of light involved in the ghost images passing through the incident pupil 353 decreases, making it difficult to see the ghost image on the screen.

On the other hand, using a wavelength-combining prism whose θd exceeds 55° keeps the tendency to make it difficult to see ghost images, but makes it difficult to locate the EL elements as explained using FIGS. 21(A) to (C) above. Moreover, if the size of the wavelength-combining prism is increased, the back focus of the projection lens needs to be extended, and therefore the size of the projection lens is increased consequently, which leads to increases in both space and cost. Therefore, it is preferable to use a wavelength-combining prism whose θd is greater than 45° and smaller than 55°.

As explained above, this embodiment 5 uses a wavelength-combining prism having the above-described structure, and can thereby reduce the possibility that unnecessary ghost images will be shown on the projection target object such as a screen.

Furthermore, by making the acute angle θd formed between the dichroic waveband separating film and the optical axis of the projection lens greater than 45° and smaller than 55°, it is possible to prevent ghost images from being shown without increasing the sizes of the wavelength-combining prism, such as a cross dichroic prism and projection lens from the standpoint of the arrangement of the EL elements.

Furthermore, when θd is greater than 45°, the difference in the separating cut wavelength of transmission and reflection for S-polarized light and P-polarized light of the dichroic waveband separating film tends to be decreased, and therefore when light beams emitted from the EL elements which are generally non-polarized are color-combined, small but advantageous effects can also be produced incidentally.

The configuration shown in Embodiment 5 is not limited to a projector, but is also applicable to a head mounted display or head up display, etc., used to observe virtual images of an EL element.

While preferred embodiments have been described, it is to be understood that modification and variation of the present invention may be made without departing from scope of the following claims.

What is claimed is:

1. A projection type image display apparatus comprising:
   an electroluminescence element having a plurality of pixels that can be individually modulated, in which two-dimensionally arranged pixels generate excitons by injecting charge carriers into a luminescent layer and generate and emit light by recombination of the excitons; and
   a projection optical system that projects light emitted from the pixels in the electroluminescence element onto a target object,
   wherein the projection optical system has a characteristic non-telecentric toward the electroluminescence element as a luminous object with principal rays which pass through the median point of an aperture pupil that captures light diffusively emitted from the pixels converging when seen from the electroluminescence element, at a pixel position where the object height on the electroluminescence element from an optical axis of the projection optical system reaches a maximum.

2. The projection type image display apparatus according to claim 1, wherein the principal ray which is non-telecentric toward the luminous object is tilted 5 degrees or more with respect to the normal line of the image modulation plane of the electroluminescence element at the position of the maximum object height.

3. The projection type image display apparatus according to claim 1, wherein the electroluminescence element has a repetitive matrix array of emission pixels for three primary colors and displays an additive color mixture image.

4. The projection type image display apparatus according to claim 1, further comprising:
three electroluminescence elements emitting three primary color light beams respectively; and
a wavelength-combining element that combines the light beams emitted from the three electroluminescence elements using dichroic films,
wherein the projection optical system projects the light combined by the wavelength-combining element onto the target object and displays an additive color mixture image.

5. The projection type image display apparatus according to claim 4, wherein the three electroluminescence elements are a red electroluminescence element, green electroluminescence element and blue electroluminescence element that emit light beams of red, green and blue which are three primary colors, respectively
the wavelength-combining element has a red reflecting dichroic film that reflects red light and transmits green light and blue light and a blue reflecting dichroic film that reflects blue light and transmits green light and red light,
the light emitted from the red electroluminescence element is reflected on the red reflecting dichroic film, transmitted through the blue reflecting dichroic film and led into the projection optical system, the light emitted from the blue electroluminescence element is reflected on the blue reflecting dichroic film, transmitted through the red reflecting dichroic film and led into the projection optical system, and the light emitted from the green electroluminescence element is transmitted through the red reflecting dichroic film and the blue reflecting dichroic film and led into the projection optical system,
wherein, when an angle formed by the normal lines of the dichroic films with respect to the optical axis of the projection optical system is $\theta a$;
an angle formed by the principal ray with respect to the normal line of the emission plane of the electroluminescence element at the position of the maximum object height from the optical axis in the emission region of the electroluminescence element within a plane on which the three color light beams are combined is $\theta p$; and
a half angle at which an aperture pupil of the projection optical system that captures the light beam emitted from the electroluminescence element observes the position of the maximum object height from the optical axis in the emission region of the electroluminescence element is $\theta n$,
a half-value intensity wavelength on the short wavelength side of the wavelength spectrum of the light emitted from the red electroluminescence element is longer than the 80% reflected wavelength at the average of S-polarized light and P-polarized light at an angle of incidence of $\theta a+\theta p+\theta n$ with respect to the normal line of the red reflecting dichroic film,
a half-value intensity wavelength on the long wavelength side of the wavelength spectrum of the light emitted from the blue electroluminescence element is shorter than the 80% reflected wavelength at the average of S-polarized light and P-polarized light at an angle of incidence of $\theta a-\theta p-\theta n$ with respect to the normal line of the blue reflecting dichroic film,
a half-value intensity wavelength on the short wavelength side of the wavelength spectrum of the light emitted from the green electroluminescence element is longer than the 20% reflected wavelength at the average of S-polarized light and P-polarized light at an angle of incidence of $\theta a+\theta p+\theta n$ with respect to the normal line of the blue reflecting dichroic film, and
a half-value intensity wavelength on the long wavelength side of the wavelength spectrum of the light emitted from the green electroluminescence element is shorter than the 20% reflected wavelength at the average of S-polarized light and P-polarized light at an angle of incidence of $\theta a-\theta p-\theta n$ with respect to the normal line of the red reflecting dichroic film.

6. The projection type image display apparatus according to claim 4, wherein the three electroluminescence elements are a red electroluminescence element, green electroluminescence element and blue electroluminescence element that emit light beams of red, green and blue which are three primary colors, and emit the polarized light whose polarization direction is perpendicular to the plane on which the three color beams are combined by the wavelength-combining element preferentially over polarized light whose polarization direction is in parallel to the plane,
the wavelength-combining element includes a red reflecting dichroic film that reflects red light and transmits green light and blue light, and a blue reflecting dichroic film that reflects blue light and transmits green light and red light,
the light emitted from the red electroluminescence element is reflected on the red reflecting dichroic film, transmitted through the blue reflecting dichroic film and led into the projection optical system, the light emitted from the blue electroluminescence element is reflected on the blue reflecting dichroic film, transmitted through the red reflecting dichroic film and led into the projection optical system, and the light emitted from the green electroluminescence element is transmitted through the red reflecting dichroic film and the blue reflecting dichroic film and led into the projection optical system,
wherein, when an the angle formed by the normal lines of the dichroic films with respect to the optical axis of the projection optical system is $\theta a$;
an angle formed by the principal ray with respect to the normal line of the emission plane of the electroluminescence element at the position of the maximum object height from the optical axis in the emission region of the electroluminescence element within a plane on which the three color light beams are combined is $\theta p$; and
a half angle at which an aperture pupil of the projection optical system that captures the light beam emitted from the electroluminescence element observes the position of the maximum object height from the optical axis in the emission region of the electroluminescence element is $\theta n$,
a half-value intensity wavelength on the short wavelength side of the wavelength spectrum of the light emitted from the red electroluminescence element is longer than the 80% reflected wavelength of S-polarized light forming an angle of incidence of θa+θp+θn with respect to the normal line of the red reflecting dichroic film, a half-value intensity wavelength on the long wavelength side of the wavelength spectrum of the light emitted from the blue electroluminescence element is shorter than the 80% reflected wavelength of S-polarized light forming an angle of incidence of θa−θp−θn with respect to the normal line of the blue reflecting dichroic film, a half-value intensity wavelength on the short wavelength side of the wavelength spectrum of the light emitted from the green electroluminescence element is longer than the 20% reflected wavelength of S-polarized light forming an angle of incidence of θa+θp+θn with respect to the normal line of the blue reflecting dichroic film, and a half-value intensity wavelength on the long wavelength side of the wavelength spectrum of the light emitted from the green electroluminescence element is shorter than the 20% reflected wavelength of S-polarized light forming an angle of incidence of θa−θp−θn with respect to the normal line of the blue reflecting dichroic film.

7. An image display system comprising:
the projection type image display apparatus according to claim 1; and
a screen onto which an image is projected by the projection type image display apparatus,
wherein an image projected on the screen is recognized by an observer by means of diffused light that has been reflected by the screen and has predetermined directivity.

8. An image display system comprising:
the projection type image display apparatus according to claim 1; and
a screen onto which an image is projected by the projection type image display apparatus,
wherein an image projected on the screen is recognized by an observer by means of diffused light that has been transmitted through the screen and has predetermined directivity.

9. A projection type image display apparatus comprising:
an electroluminescence element having a plurality of pixels that can be individually modulated, in which two-dimensionally arranged modulation pixels generate excitons by injecting charge carriers into a luminescent layer and generate and emit light by recombination of the excitons; and
a projection optical system that projects light emitted from the pixels in the electroluminescence element onto a target object and displays an image,
wherein the luminescent layer of the electroluminescence element has a film structure based on the structure in which the luminescent layer is sandwiched between one or more charge carrier transfer layers for supplying electrons and holes to the luminescent layer, and
a light emission direction control element having two-dimensionally arranged microstructures having a pyramid-shaped pentahedron as a refractive index boundary is placed in contact on an emission side of the film structure.

10. The projection type image display apparatus according to claim 9, wherein the electroluminescence element has a repetitive matrix arrangement of emission pixels of three primary colors and displays an additive color mixture image.

11. The projection type image display apparatus according to claim 9, further comprising:
three electroluminescence elements that emit three primary color beams respectively; and
a wavelength-combining element that combines the light beams emitted from the three electroluminescence elements using dichroic films,
wherein the projection optical system projects the light combined by the wavelength-combining element onto the target object and displays an additive color mixture image.

12. The projection type image display apparatus according to claim 9, wherein the light emission direction control element has a structure with a transparent material embedded in a pyramid shape on the surface of a transparent glass substrate or transparent plastic substrate on which the film structure of the electroluminescence element is formed, the transparent material having a refractive index higher than the refractive index of the substrate.

13. The projection type image display apparatus according to claim 9, wherein the light emission direction control element is a microstructure film with a transparent material embedded in a pyramid shape on the surface of one side of a substrate film made of transparent glass or transparent plastic, the transparent material having a refractive index higher than the refractive index of the substrate,
the microstructure film is joined to a surface layer on the emission side of the film structure of the electroluminescence elements formed on a surface of a logic circuit substrate in which a logic circuit controlling light emission is formed.

14. The projection type image display apparatus according to claim 13, wherein the microstructure film is joined to the surface layer on the emission side of the electroluminescence element by vacuum lamination, compatible adhesion through a solvent or adhesion through a hard thin film adhesion layer.

15. The projection type image display apparatus according to claim 9, wherein an arranging pitch of the microstructures is 1/N (N: positive integer) of the pitch of the pixels arranged in an image modulation display panel made up of the electroluminescence element.

16. The projection type image display apparatus according to claim 15, wherein the arranging pitch of the microstructures is equal to the pitch of the pixels at display surface coordinates of the image modulation display panel, and
the positions of vertices of the microstructures align with the position of the area median point of the pixel emission area with the accuracy of ⅕ of the pitch of the pixels or higher.

17. The projection type image display apparatus according to claim 15, wherein the arranging pitch of the microstructures is 1/N (N: positive integer) of the pitch of the pixels, and
the microstructure film is joined without being aligned with the position of each pixel arranged in the image modulation display panel.

18. An image display system comprising:
the projection type image display apparatus according to claim 9; and
a screen onto which an image is projected by the projection type image display apparatus,
wherein an image projected on the screen is recognized by an observer by means of diffused light that has been reflected by the screen and has predetermined directivity.

19. An image display system comprising:

the projection type image display apparatus according to claim 9; and a screen onto which an image is projected by the projection type image display apparatus, wherein an image projected on the screen is recognized by an observer by means of diffused light that has been transmitted through the screen and has predetermined directivity.

20. A projection type image display apparatus comprising:

three electroluminescence elements each having a plurality of pixels that can be individually modulated and emitting three primary color light beams respectively, in which two-dimensionally arranged modulation pixels generate excitons by injecting charge carriers into a luminescent layer and generate and emit light by recombination of the excitons;

a cross dichroic wavelength-combining element that combines the light beams emitted from the three electroluminescence elements using dichroic films in a crossing arrangement; and a projection optical system that projects the light combined by the cross dichroic wavelength-combining element onto a target object and displays an additive color mixture image, wherein the cross dichroic wavelength-combining element has a pyramid shape with six or more external surfaces, an acute angle formed between the dichroic film and an optical axis of the projection optical system is greater than 45°, the cross dichroic wavelength-combining element has four surfaces perpendicular to three optical axes including the optical axis of the projection optical system which is deflected by the dichroic films, and three of the four surfaces are arranged substantially in parallel to modulation emission planes of the three electroluminescence elements and the combined light is emerged from the remaining one surface toward the projection optical system.

21. The projection type image display apparatus according to claim 20, wherein the acute angle formed between the dichroic film and the optical axis of the projection optical system is greater than 45° and smaller than 55°.

22. The projection type image display apparatus according to claim 20, wherein the lengths of the normal lines from the ridges on which the dichroic films cross each other to the three surfaces substantially in parallel to the modulation emission planes of the electroluminescence elements are substantially equal to each other.

23. An image display system comprising:

the projection type image display apparatus according to claim 20; and a screen onto which an image is projected by the projection type image display apparatus, wherein an image projected on the screen is recognized by an observer by means of diffused light that has been reflected by the screen and has predetermined directivity.

24. An image display system comprising:

the projection type image display apparatus according to claim 20; and a screen onto which an image is projected by the projection type image display apparatus, wherein an image projected on the screen is recognized by an observer by means of diffused light that has been transmitted through the screen and has predetermined directivity.

* * * * *

UNITED STATES PATENT AND TRADEMARK OFFICE
CERTIFICATE OF CORRECTION

PATENT NO. : 6,951,393 B2  Page 1 of 1
APPLICATION NO. : 10/614265
DATED : October 4, 2005
INVENTOR(S) : Koide It is certified that error appears in the above-identified patent and that said Letters Patent is hereby corrected as shown below:

On title page Item

[57] ABSTRACT:

Line 2, "the projects" should read --that projects--.

COLUMN 2:

Line 8, "H1 (1999)-67448" should read --H11 (1999)-67448,--.

COLUMN 15:

Line 59, "2The" should read --The--.

COLUMN 24:

Line 15, "projections" should read --projection--.

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,951,393 B2  Page 1 of 1
APPLICATION NO. : 10/614205
DATED : October 4, 2005
INVENTOR(S) : Koide It is certified that error appears in the above-identified patent and that said Letters Patent is hereby corrected as shown below:

On title page Item

[57] ABSTRACT:

Line 2, "the projects" should read --that projects--.

COLUMN 2:

Line 8, "H1 (1999)-67448" should read --H11 (1999)-67448,--.

COLUMN 15:

Line 59, "2The" should read --The--.

COLUMN 24:

Line 15, "projections" should read --projection--.

This certificate supersedes Certificate of Correction issued August 1, 2006.

Signed and Sealed this

Nineteenth Day of September, 2006

JON W. DUDAS
*Director of the United States Patent and Trademark Office*